(12) United States Patent
Gillick et al.

(10) Patent No.: US 10,063,712 B2
(45) Date of Patent: *Aug. 28, 2018

(54) SYSTEM AND METHOD FOR DYNAMICALLY ALLOCATING QUOTA FOR SHARED BALANCES IN DISTRIBUTED TELECOMMUNICATIONS NETWORKS

(71) Applicant: OPENET TELECOM LTD., Dublin (IE)

(72) Inventors: Tony Gillick, Dublin (IE); Roland Holland, Wicklow (IE); Barry Mulvin, Dublin (IE); Craig Ferguson, Kildare (IE); Andrew D'Souza, Silver Spring, MD (US)

(73) Assignee: OPENET TELECOM LTD., Dublin (IE)

( * ) Notice: Subject to any disclaimer, the term of this patent is extended or adjusted under 35 U.S.C. 154(b) by 343 days.

This patent is subject to a terminal disclaimer.

(21) Appl. No.: 14/311,301

(22) Filed: Jun. 22, 2014

(65) Prior Publication Data

US 2014/0378094 A1 Dec. 25, 2014

Related U.S. Application Data

(60) Provisional application No. 61/837,982, filed on Jun. 21, 2013.

(51) Int. Cl.
*H04M 15/00* (2006.01)
*H04L 12/14* (2006.01)
(52) U.S. Cl.
CPC .... *H04M 15/7652* (2013.01); *H04L 12/1403* (2013.01); *H04L 12/1457* (2013.01);
(Continued)

(58) Field of Classification Search
CPC ...... H04M 15/58; H04M 15/64; H04M 15/66; H04M 15/765; H04M 15/7652;
(Continued)

(56) References Cited

U.S. PATENT DOCUMENTS 8,452,872 B2 * 5/2013 Castro Castro ......... H04L 12/14
709/224
2003/0157925 A1 8/2003 Sorber et al.
(Continued)

OTHER PUBLICATIONS

Extended European Search Report for European Application No. 14173426 dated Sep. 16, 2014.
(Continued)

*Primary Examiner* — Frantz Bataille
(74) *Attorney, Agent, or Firm* — The Marbury Law Group, PLLC

(57) ABSTRACT

Systems and computing devices may be configured to intelligently and dynamically allocate quotas for the access and use of a telecommunications network by consumers that use a shared balance account. The dynamic allocation of quotas may include computing a total reclaimable quota size value in response to determining that quota may not be allocated to a first consumer from the shared account balance without exceeding a balance threshold, reclaiming all or portions of currently active allocated quotas from a other consumers that use the shared balance account in response to determining that the total reclaimable quota size value is greater than or equal to the minimum quota allocation size, updating the shared account balance to include the reclaimed portions, and allocating quota to the first consumer from the updated shared balance account.

23 Claims, 12 Drawing Sheets

(52) U.S. Cl.
CPC ...... *H04L 12/1471* (2013.01); *H04M 15/765* (2013.01); *H04M 15/775* (2013.01); *H04M 15/78* (2013.01); *H04M 15/785* (2013.01); *H04M 15/58* (2013.01); *H04M 15/64* (2013.01); *H04M 15/66* (2013.01)

(58) Field of Classification Search
CPC .. H04M 15/775; H04M 15/78; H04M 15/785; H04M 15/866; H04L 12/14; H04L 12/1403; H04L 12/1457; H04L 12/1471; H04W 28/16
See application file for complete search history.

(56) References Cited

U.S. PATENT DOCUMENTS

| | | | |
|---|---|---|---|
| 2004/0153407 A1 | 8/2004 | Clubb et al. | |
| 2008/0162331 A1* | 7/2008 | Ephrati | G06Q 30/06 705/37 |
| 2008/0285475 A1* | 11/2008 | Menditto | G06Q 30/0283 370/252 |
| 2009/0088128 A1* | 4/2009 | Mumford | G06Q 10/103 455/405 |
| 2012/0198058 A1* | 8/2012 | Pogorelik | G06Q 10/04 709/224 |

OTHER PUBLICATIONS

Second European Search Report issued by the European Patent Office for Application No. 14 173 426.9-1853, dated Feb. 8, 2016.

\* cited by examiner

SYSTEM AND METHOD FOR DYNAMICALLY ALLOCATING QUOTA FOR SHARED BALANCES IN DISTRIBUTED TELECOMMUNICATIONS NETWORKS

RELATED APPLICATIONS

This application claims the benefit of priority to U.S. Provisional Application No. 61/837,982 entitled "System and Method for Dynamically Allocating Quota for Shared Balances in Distributed Telecommunications Networks" filed Jun. 21, 2013, the entire contents of which is incorporated herein by reference for all purposes.

BACKGROUND

Wireless and cellular communication technologies have seen dramatic improvements over the past several years. Cellular service providers now offer users a wide array of services, higher usage limits, and attractive subscription plans. Wireless dongles and embedded wireless modem cards allow users to use tablet computers, netbooks and laptops to access wireless Internet protocol (IP) and data services through the cellular networks. Internet-enabled smart phones, tablets and gaming consoles have become essential personal accessories, connecting users to friends, work, leisure activities and entertainment. Users now have more choices and expect to have access to content, data and communications at any time, in any place.

As more users utilize these services, telecommunication system operator networks must expand to meet the increase in user demand, support the array of new services and provide fast, reliable communications. This expansion has greatly increased the complexity of wireless and cellular networks, and the management of quotas, shared balances, and signaling traffic is becoming an ever more challenging task for telecommunication service providers, network operators and network engineers.

SUMMARY

The various embodiments include methods of dynamically allocating quotas by a server computing device deployed in a telecommunications network, which may include receiving in a processor of the server computing device a quota request message from a metering and gating component (the quota request message including information requesting allocation of a first quota to a first consumer associated with a shared account balance), determining whether the first quota may be allocated to the first consumer from the shared account balance without exceeding a balance threshold, computing a total reclaimable quota size value and determining whether the total reclaimable quota size value is greater than or equal to a minimum quota allocation size in response to determining that the first quota may not be allocated to the first consumer from the shared account balance without exceeding the balance threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared balance account.

In an embodiment, computing the total reclaimable quota size value may include identifying active quotas that were allocated from the shared account balance, determining current quota allocation sizes and minimum quota sizes of the identified active quotas, computing a total quota allocation size value based on the determined current quota allocation sizes, computing a total minimum quota size value based on the determined minimum quota sizes, and computing the total reclaimable quota size value based on a difference between the total quota allocation size value and the total minimum quota size value. In a further embodiment, reclaiming the portion of the currently active allocated quota may include determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element, and increment the shared account balance by the reduced allocated quota size.

In a further embodiment, traversing the sorted eligible quota list sequentially may include determining whether the first quota may be allocated to the first consumer from the shared account balance without exceeding the balance threshold each time the shared account balance is incremented. In a further embodiment, reducing the allocated quota size of the selected element may include sending a communication message to a metering and gating component associated with selected element to cause that metering and gating component to return unused allocated quota that is in excess of the minimum quota allocation size. In a further embodiment, reducing the allocated quota size of the selected element may include sending a first communication message to a metering and gating component associated with selected element to cause that metering and gating component to return all its unused allocated quota, sending a second communication message to the metering and gating component associated with selected element to reallocate quota. In a further embodiment, reducing the allocated quota size of the selected element may include reducing the allocated quota size by half of its unused allocated quota that is in excess of the minimum quota allocation size.

In a further embodiment, sorting the eligible quota list based on the determined priority values may include sorting the eligible quota list based on one of allocated quota sizes of the elements, minimum quota sizes of the elements, difference between the allocated quota sizes and the minimum quota sizes of the elements, quota expiry times of the elements, subscriber types of the elements, session types of the elements, and service types of the elements. In a further embodiment, determining whether the first quota may be allocated to the first consumer from the shared account balance without exceeding the balance threshold may include determining whether the shared account balance is greater than or equal to a quota allocation size value included in the received quota request message.

In a further embodiment, the method may include sending a communication message to the metering and gating component indicating that quota will not be allocated in response to determining that the total reclaimable quota size value is not greater than or equal to the minimum quota allocation size. In a further embodiment, allocating the first quota to the first consumer from the updated shared balance account may include using linear interpolation to compute a balance change rate value for the shared account balance, computing a threshold breach time based on the balance change rate value, determining whether a current time is less than a tolerance time before the threshold breach time, determining whether the server computing device is an authoritative component in response to determining that the current time is less than the tolerance time before the threshold breach time, updating the shared account balance by updating balance information stored in a local memory in response to determining that the server computing device is the authoritative component, and updating the shared account balance by sending an update balance transaction to a remote balance management component in response to determining that the server computing device is not the authoritative component.

Further embodiments include a server computing device having a processor that is configured with processor-executable instructions to perform operations that include receiving a quota request message from a metering and gating component (the quota request message including information requesting allocation of a first quota to a first consumer associated with a shared account balance), determining whether the first quota may be allocated to the first consumer from the shared account balance without exceeding a balance threshold, computing a total reclaimable quota size value and determining whether the total reclaimable quota size value is greater than or equal to a minimum quota allocation size in response to determining that the first quota may not be allocated to the first consumer from the shared account balance without exceeding the balance threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared balance account.

In an embodiment, the processor may be configured with processor-executable instructions to perform operations such that computing the total reclaimable quota size value includes identifying active quotas that were allocated from the shared account balance, determining current quota allocation sizes and minimum quota sizes of the identified active quotas, computing a total quota allocation size value based on the determined current quota allocation sizes, computing a total minimum quota size value based on the determined minimum quota sizes, and computing the total reclaimable quota size value based on a difference between the total quota allocation size value and the total minimum quota size value.

In a further embodiment, the processor may be configured with processor-executable instructions to perform operations such that reclaiming the portion of the currently active allocated quota includes determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element, and increment the shared account balance by the reduced allocated quota size.

In a further embodiment, the processor may be configured with processor-executable instructions to perform operations such that traversing the sorted eligible quota list sequentially further includes determining whether the first quota may be allocated to the first consumer from the shared account balance without exceeding the balance threshold each time the shared account balance is incremented. In a further embodiment, the processor may be configured with processor-executable instructions to perform operations such that reducing the allocated quota size of the selected element includes sending a communication message to a metering and gating component associated with selected element to cause that metering and gating component to return unused allocated quota that is in excess of the minimum quota allocation size.

In a further embodiment, the processor may be configured with processor-executable instructions to perform operations such that reducing the allocated quota size of the selected element includes sending a first communication message to a metering and gating component associated with selected element to cause that metering and gating component to return all its unused allocated quota, sending a second communication message to the metering and gating component associated with selected element to reallocate quota In a further embodiment, the processor may be configured with processor-executable instructions to perform operations such that reducing the allocated quota size of the selected element includes reducing the allocated quota size by half of its unused allocated quota that is in excess of the minimum quota allocation size.

In a further embodiment, the processor may be configured with processor-executable instructions to perform operations such that sorting the eligible quota list based on the determined priority values includes sorting the eligible quota list based on one of allocated quota sizes of the elements, minimum quota sizes of the elements, difference between the allocated quota sizes and the minimum quota sizes of the elements, quota expiry times of the elements, subscriber types of the elements, session types of the elements, and service types of the elements.

In a further embodiment, the processor may be configured with processor-executable instructions to perform operations such that determining whether the first quota may be allocated to the first consumer from the shared account balance without exceeding the balance threshold includes determining whether the shared account balance is greater than or equal to a quota allocation size value included in the received quota request message. In a further embodiment, the processor may be configured with processor-executable instructions to perform operations further including sending a communication message to the metering and gating component indicating that quota will not be allocated in response to determining that the total reclaimable quota size value is not greater than or equal to the minimum quota allocation size.

In a further embodiment, the processor may be configured with processor-executable instructions to perform operations such that allocating the first quota to the first consumer from the updated shared balance account includes using linear interpolation to compute a balance change rate value for the shared account balance, computing a threshold breach time based on the balance change rate value, determining whether a current time is less than a tolerance time before the threshold breach time, determining whether the server computing device is the authoritative component that has exclusive access to the shared account balance in response to determining that the current time is less than the tolerance time before the threshold breach time, updating the shared account balance by updating balance information stored in a local memory in response to determining that the server computing device is the authoritative component, and updating the shared account balance by sending an update balance transaction to a remote balance management component in response to determining that the server computing device is not the authoritative component.

Further embodiments include a non-transitory computer readable storage medium having stored thereon processor-executable software instructions configured to cause a processor of a server computing device to perform operations that include receiving a quota request message from a metering and gating component (the quota request message including information requesting allocation of a first quota to a first consumer associated with a shared account balance), determining whether the first quota may be allocated to the first consumer from the shared account balance without exceeding a balance threshold, computing a total reclaimable quota size value and determining whether the total reclaimable quota size value is greater than or equal to a minimum quota allocation size in response to determining that the first quota may not be allocated to the first consumer from the shared account balance without exceeding the balance threshold, reclaiming a portion of a currently active allocated quota and updating the shared account balance to include the reclaimed portion in response to determining that the total reclaimable quota size value is greater than or equal to the minimum quota allocation size, and allocating the first quota to the first consumer from the updated shared balance account.

In an embodiment, the stored processor-executable software instructions may be configured to cause a processor to perform operations such that computing the total reclaimable quota size value includes identifying active quotas that were allocated from the shared account balance, determining current quota allocation sizes and minimum quota sizes of the identified active quotas, computing a total quota allocation size value based on the determined current quota allocation sizes, computing a total minimum quota size value based on the determined minimum quota sizes, and computing the total reclaimable quota size value based on a difference between the total quota allocation size value and the total minimum quota size value.

In a further embodiment, the stored processor-executable software instructions may be configured to cause a processor to perform operations such that reclaiming the portion of the currently active allocated quota includes determining a priority value for each of a plurality of elements in an eligible quota list, in which one of the plurality of elements is the currently active allocated quota, sorting the eligible quota list based on the determined priority values, and traversing the sorted eligible quota list sequentially to select an element from the eligible quota list, reduce an allocated quota size of the selected element, and increment the shared account balance by the reduced allocated quota size.

In a further embodiment, the stored processor-executable software instructions may be configured to cause a processor to perform operations such that traversing the sorted eligible quota list sequentially further includes determining whether the first quota may be allocated to the first consumer from the shared account balance without exceeding the balance threshold each time the shared account balance is incremented. In a further embodiment, the stored processor-executable software instructions may be configured to cause a processor to perform operations such that reducing the allocated quota size of the selected element includes sending a communication message to a metering and gating component associated with selected element to cause that metering and gating component to return unused allocated quota that is in excess of the minimum quota allocation size.

In a further embodiment, the stored processor-executable software instructions may be configured to cause a processor to perform operations such that reducing the allocated quota size of the selected element includes sending a first communication message to a metering and gating component associated with selected element to cause that metering and gating component to return all its unused allocated quota, sending a second communication message to the metering and gating component associated with selected element to reallocate quota In a further embodiment, the stored processor-executable software instructions may be configured to cause a processor to perform operations such that reducing the allocated quota size of the selected element includes reducing the allocated quota size by half of its unused allocated quota that is in excess of the minimum quota allocation size.

In a further embodiment, the stored processor-executable software instructions may be configured to cause a processor to perform operations such that sorting the eligible quota list based on the determined priority values includes sorting the eligible quota list based on one of allocated quota sizes of the elements, minimum quota sizes of the elements, difference between the allocated quota sizes and the minimum quota sizes of the elements, quota expiry times of the elements, subscriber types of the elements, session types of the elements, and service types of the elements. In a further embodiment, the stored processor-executable software instructions may be configured to cause a processor to perform operations such that determining whether the first quota may be allocated to the first consumer from the shared account balance without exceeding the balance threshold includes determining whether the shared account balance is greater than or equal to a quota allocation size value included in the received quota request message.

In a further embodiment, the stored processor-executable software instructions may be configured to cause a processor to perform operations further including sending a communication message to the metering and gating component indicating that quota will not be allocated in response to determining that the total reclaimable quota size value is not greater than or equal to the minimum quota allocation size. In a further embodiment, the stored processor-executable software instructions may be configured to cause a processor to perform operations such that allocating the first quota to the first consumer from the updated shared balance account includes using linear interpolation to compute a balance change rate value for the shared account balance, computing a threshold breach time based on the balance change rate value, determining whether a current time is less than a tolerance time before the threshold breach time, determining whether the server computing device is the authoritative component that has exclusive access to the shared account balance in response to determining that the current time is less than the tolerance time before the threshold breach time, updating the shared account balance by updating balance information stored in a local memory in response to determining that the server computing device is the authoritative component, and updating the shared account balance by sending an update balance transaction to a remote balance management component in response to determining that the server computing device is not the authoritative component.

Further aspects may include a server computing device having various means for performing functions corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DESCRIPTION

Figure 1:
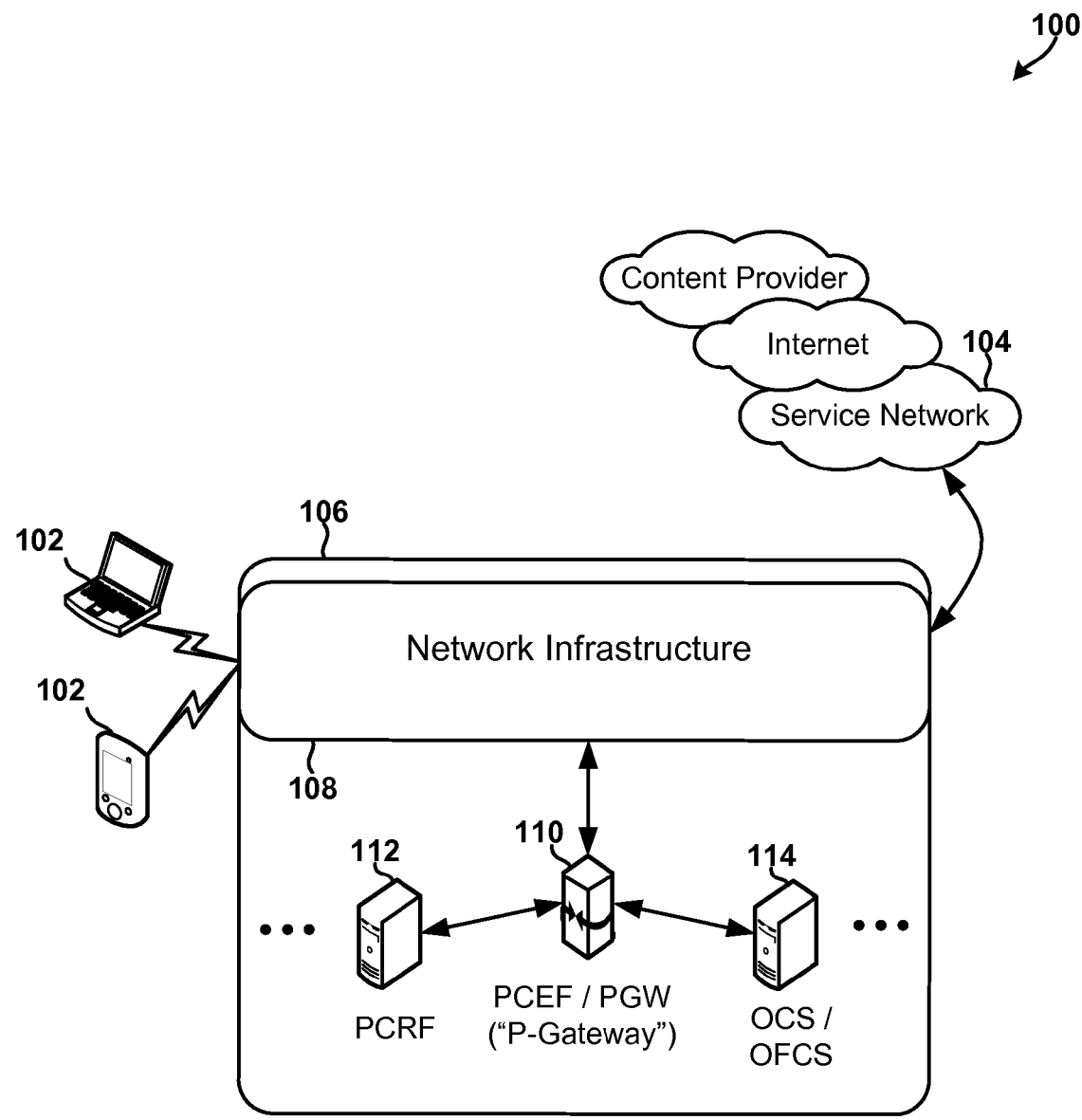
FIGS. 1 and 2 are system block diagrams illustrating telecommunication systems that are suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, and/or a computing system.

The terms "user", "subscriber", and "customer" may be used interchangeably and refer to the end consumer of services provided by a telecommunications network operator.

The terms "mobile device," "wireless device" and "user equipment (UE)" may be used interchangeably and refer to any one of various cellular telephones, smart-phones (e.g., iPhone®), personal data assistants (PDA's), palm-top computers, tablet computers, laptop computers, wireless electronic mail receivers (e.g., Blackberry®), VoIP phones, wire-line devices, devices implementing Machine-to-Machine (M2M) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which can communicate via a cellular telephone communications network.

A number of different wireline and wireless communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden).

To focus the discussion on the relevant features and functionalities, the various embodiments may be described with reference to specific architectures and components of a 3GPP mobile network. However, all references to terminology and/or technical details related to an individual standard or technology are for illustrative purposes only, and are not intended to limit the scope of the claims to a particular communication system, technology, architecture, or component unless specifically recited in the claim language.

The various embodiments include network components (e.g., server computing devices, etc.) configured to provide a telecommunication network with improved quota allocation and multi-site balance management solutions, and to overcome many of the challenges faced by mobile network operators who deploy policy and charging control systems or other similar systems for real-time service and subscriber controls.

A telecommunications network may include a metering and gating component that is responsible for enforcing policy and charging rules to control the bandwidth, the quality of service (QoS), and other characteristics of the services provided to end users based on their subscription plans and available balances. The metering and gating component may also meter the usage of services and resources by the end users, and generate detailed charging records (e.g., Charge Detail Records or "CDRs") that identify the services and resources consumed by the end users. As part of these operations, the metering and gating component may communicate with a balance management component to identify the policies that are to be enforced, to ensure proper billing, and/or to prevent revenue leakage.

For example, the metering and gating component may be configured to determine the services requested by an end user (e.g., subscriber), and communicate with the balance management component to determine whether the end user has sufficient funds, credits, access units, and/or service unit allowances to receive the requested services. The metering and gating component may then control the characteristics of services provided to that end user based on the determined availability of funds, credits, access units, or service units allowance. That is, the metering and gating component may grant or deny the user access to services, throttle the user's bandwidth, send the user notification messages, and/or perform other similar operations based on an account balance or the availability of funds, credits, access units, or service units allowance in that user's balance account.

Due to the speed, latency, responsiveness, and availability requirements placed on these networks, it is often difficult to ensure proper billing while providing users with adequate levels of service. For example, multiple independent components (e.g., multiple control systems, user equipment devices, software applications, services, etc.) may read and write information to single distributed balance account (i.e., may update a shared account balance), which may require the use of database locks and other complex controls to avoid race conditions, ensure the integrity of the data, and accurately bill the end users for the use of services. In addition, accessing or updating a user's balance information frequently or in real-time may require communicating large volumes of signaling information across the network, which may increase network traffic and data access times beyond that which is acceptable by the end users, client applications, or telecommunications operators.

To ensure proper billing and provide users with adequate levels of service, the network components may be configured to provide services based on quotas. A quota may be any information unit or structure that includes an allocated quota size value that identifies a pre-allocated amount of funds, credits, access units, or service unit allowances. The metering and gating component may request and receive a quota from the balance management component, and provide the end users with services that are commensurate with the funds, credits, access units, or service unit allowances identified in the quota. In an embodiment, the metering and gating component may request and receive the quota (or information suitable for generating a quota) via Credit-Control-Request (CCR) and Credit-Control-Answer (CCA) messages, respectively. The CCR and CCA messages may be Diameter protocol messages and/or specified as part of the Diameter Credit Control Application (DCCA).

As an example, the metering and gating component may request a quota as part of its service initiation processes by generating and sending a quota allocation request message (e.g., a CCR message, etc.) to the balance management component. In response, the balance management component may determine whether the user's remaining balance is greater than a default allocation unit or an allocation unit that is specified in the received quota allocation request message. If the available balance is greater than the allocation unit, the balance management component may allocate the quota by decrementing the user's available balance (or by reserving part of the available balance so that it is not available for future allocation), generating a quota allocation response message that includes an allocated quota size (e.g., amount of pre-allocated credits, access units, service unit allowances, etc.) and a time period during which the allocated quota remains valid, and sending a quota allocation response message to the metering and gating component. The metering and gating component may receive the quota allocation response message, begin providing the end user with access to the requested services, monitor or meter the usage or consumption the services by the end user, and decrement the allocated quota size (e.g., the pre-allocated funds, credits, access units) as the services are used or consumed by the end user.

When the allocated quota has been consumed, the metering and gating component may request an additional quota from the balance management component via an update quota request message. The metering and gating component may also generate and send an update quota request message to the balance management component in response to determining that the quota's validity period has expired or that the services have been terminated. Thus, in addition to a request for the allocation of additional quota, the update quota request message may include information identifying the amount of the previously allocated quota that was consumed and/or that remains unused. The balance management component may use this information to allocate additional quotas and/or to return the unused funds, credits, access units, or service units allowance to the user's balance account. In an embodiment, the balance management component may be configured to request that the metering and gating component return unused portions of the allocated quota at any time, and subsequently send a new quota allocation to the metering and gating component.

As mentioned above, the metering and gating component may request a specific quota size (e.g., amount of funds, credits, access units, or service units allowance) by specifying an allocation unit in the quota allocation request message, or the balance management component may determine the quota size based on default allocation unit. In both cases, the quota size is determined statically based upon business criteria. Yet, the selection of the quota size is an important consideration since it may have a significant impact on the performance of the telecommunication system. For example, if the quota size is too small, the metering and gating component will repeatedly request additional quotas from the balance management component, which may increase the volume or amount of signaling communications in the network. On the other hand, if the quota size is too high, then the requested balance will be depleted too frequently while there are active sessions, which may block other services and cause subscriber confusion.

In view of these facts, the various embodiments include components configured to intelligently and dynamically determine the quota sizes so as to balance tradeoffs between providing users with satisfactory levels of service, reducing network traffic, and ensuring correct billing for the access and use of services.

In addition to providing services based on quotas, the network components may be configured to define and use balance thresholds or limits. A balance threshold may be defined against a user balance so that the breaching of a threshold (in either the upwards or downwards direction) causes one or more actions to be performed. These actions may include generating subscriber notifications without changing the behaviour of the mobile network. For example, subscribers may receive SMS-based notifications when they consume 75% and 90% of their balances. These actions may also include changing the characteristics or the services provided to the end users without blocking the service (e.g., subscribers may receive a reduced service level when they consume 95% of their balances) or terminating the service (e.g., subscribers may have the service blocked when they consume 100% of their balances). As another example, a user's subscription plan may provide for 100 free outbound messages, with a per message charge for messages in excess of this limit. The user may receive notifications as they approach this limit (e.g., after sending 95 messages) and then a separate notification after the 100th message to inform her/him that a per message charge will be incurred for each subsequent message sent. As a further example, a user's subscription plan may provide for 500 free voice minutes, with a $0.05 per minute charge between 500 and 750 minutes, and a $0.02 per minute charge for voice usage in excess of 750 minutes. The user may receive notifications as they approach the first limit (e.g., after 475 minutes are used) and then a separate notification after the 500th minute to inform her/him that a $0.05 per minute charge will be incurred for each subsequent voice call. A further notification may be sent as the user's balance approaches the second limit (e.g., after 725 minutes are used) and then a final notification after the 750th minute to inform her/him that a $0.02 per minute charge will be incurred for each subsequent voice call.

These subscriber notifications and/or changes to service levels are typically implemented via policy rules. As a result, frequent threshold breaches may cause a significant increase in the volume of signaling traffic (e.g., due to policy rules being communicated between components in the network). Accordingly, in the various embodiments, the components may be configured to perform quota allocation and balance threshold tracking operations so as to reduce the volume of signaling traffic in the network. These components may also be configured to intelligently and dynamically allocate granular quotas and/or to accurately and efficiently monitor the usage or consumption of the services (including roaming usage) against balance thresholds so as to avoid frequent threshold breaches, ensure that the required subscriber notifications and/or changes to service levels are triggered and executed in a timely manner, and that there is little or no revenue loss to the mobile network operator.

Generally, quota allocation and balance threshold tracking operations become more challenging and complex when a single account balance is shared and used concurrently by multiple consumers (e.g., services, sessions, subscribers, etc.). As a first example of such a scenario, multiple concurrent services (e.g., voice, email, web browsing) within a single subscriber session may share a single balance account. These services are often assigned to rating groups such that all services within a single rating group are billed or charged in the same manner. Thus, each rating-group may correspond to one or more services, any or all of which may concurrently access and use a single balance account and/or concurrently update a shared account balance.

As another example of a user balance being concurrently shared between multiple consumers, multiple subscribers may share a single balance account (e.g., family accounts, corporate accounts) and each subscriber may have multiple sessions, any or all of which may concurrently access and use the same balance account. As yet another example, multiple concurrent sessions for a single subscriber may share a single balance. These sessions may be associated with a single device (e.g., a smartphone) or with multiple devices (e.g., a smartphone and a tablet) that are covered by the same subscription plan and a single balance. Each session may contain multiple services.

In all these cases, it is challenging to use existing solutions to allocate quotas, accurately track the usage of services against balance thresholds, prevent revenue loss, and provide the end users with adequate levels of service. For example, since the network components (e.g., balance management component, etc.) operate in real-time to control subscribers' use of network resources, services, and applications, they are required to be highly available. In order to meet this requirement, the components are typically deployed in an active-active configuration, i.e., deployment across two or more geographically dispersed sites, each of which is actively supporting and processing subscribers in the network. In addition, a single shared balance may exist in each site (i.e., in different physical locations) and may be modified at any of these sites, for example with a shared family/group balance that is being used concurrently by multiple individuals in different geographic locations. For these and other reasons, using existing solutions to access and update the user's balance information in real-time may require communicating large volumes of information across the network and/or performing cumbersome operations that increase network congestion and data access times beyond that which is acceptable by subscribers, client applications, and telecommunications operators.

In addition, existing solutions typically require that quota allocations have fixed sizes regardless of other factors (e.g., the size of the remaining balance, the number of active sessions). As discussed above, the quota allocations (e.g., quota sizes) can be set sufficiently small to ensure that the risk that balance thresholds are inadvertently exceeded is minimized. However, if the quota allocations are set too low then there will be an excessive amount of signaling in the network due to new quota allocations being requested too frequently. If the quota allocations (e.g., quota sizes) are set high, then the amount of signaling in the network due to new quota allocations being requested can be reduced. However, if the quota allocation is set too high then the shared balance may frequently and erroneously breach the balance thresholds. In some cases this may cause services, sessions, and subscribers to be throttled or blocked, ultimately leading to unnecessary subscriber confusion.

The various embodiments overcome the above-mentioned limitations of existing solutions by configuring network components to dynamically determine the quota sizes/quota allocations, maintain the data integrity of a user balance account across multiple geographically dispersed active sites, reduce the number of balance threshold breaches, and to balance tradeoffs between tolerating balance threshold breaches and generating acceptable levels of signaling in the network.

In some embodiments, the components may be configured to intelligently, flexibly, and dynamically determine the quota sizes for a consumer (e.g., services, sessions, subscribers, etc.) associated with a balance account that is shared by multiple consumers or an account balance that used by multiple consumers. The components may be further configured to minimize the volume of quota-based signaling messages, to enforce quota thresholds to the required degree of accuracy and timeliness, to intelligently distribute a quota across concurrent consumers (e.g., services, sessions, subscribers, etc.) of a shared balance, to intelligently balance trade-offs between threshold accuracy and other business or technical objectives, to ensure that the quota allocation algorithms are as efficient as possible while still meeting the business or technical objectives, and to mitigate the risks of a shared balance threshold being inadvertently breached based on the rate of change of that shared balance.

In some embodiments, the components may also be configured to allow the mobile network operator to set the appropriate policy rules that will be applied when the thresholds are breached and/or to specify the maximum threshold breach that is to be tolerated before the appropriate policy rules are applied. For example, if a business requirement specifies that a subscriber should have a service blocked when he/she consumes 100% of his/her balance, then the component may allow that mobile network operator to determine the appropriate policy rule that will be applied when the shared balance is at a minimum of 100% of the balance threshold and a maximum of 105% of the balance threshold.

In an embodiment, the components may include a balance management component that is configured to receive a quota request message that includes information requesting allocation of a first quota to a first consumer (e.g., service, session, subscriber, etc.) from a shared balance account. The shared balance account may include a shared account balance that is used by multiple consumers. In an embodiment, the shared account balance may identify the quantity of service unit allowances that are available for allocation to the consumers. A service unit allowance may be a service or access unit that may be allocated to a consumer and used to determine the amount of services that are to be provided to that consumer by components in the telecommunication network, such as by a metering and gating component or a policy and charging enforcement function component.

In an embodiment, the balance management component may be configured to determine whether the first quota may be allocated to the first consumer from the shared account balance without exceeding a balance threshold. For example, the balance management component may determine whether the shared account balance is greater than or equal to a quota allocation size value included in the received quota request message and/or whether the shared account balance is greater than or equal to a minimum quota allocation size value. The minimum quota allocation size value may be included in the received quota request message or determined by the balance management component.

In an embodiment, the balance management component may be configured to allocate the first quota in response to determining that the first quota may be allocated to the first consumer from the shared account balance without exceeding the balance threshold. Allocating the first quota may include allocating a first quantity of service unit allowances, access units, or any other information unit that may be used to determine the amount of resources and/or services that are to be provided to a consumer by the telecommunication network In an embodiment, the balance management component may be configured to compute a total reclaimable quota size value in response to determining that the first quota may not be allocated to the first consumer from the shared account balance without exceeding the balance threshold. The balance management component may be configured to compute a total reclaimable quota size value by identifying the active quotas that were allocated from the shared account balance, determining the current quota allocation sizes and the minimum quota sizes of the identified active quotas, computing a total quota allocation size value based on the determined current quota allocation sizes, and computing a total minimum quota size value based on the determined minimum quota sizes. The balance management component may then compute the total reclaimable quota size value as being the difference between the total quota allocation size value and total minimum quota size value.

In an embodiment, the balance management component may be configured to determine whether the total reclaimable quota size value is greater than or equal to a minimum quota allocation size in response to determining that the first quota may not be allocated to the first consumer from the shared account balance without exceeding a balance threshold.

In an embodiment, the balance management component may be configured to send a communication message to the metering and gating component indicating that quota (or services unit allowances, service access units, etc.) will not be allocated to the first consumer in response to determining that the total reclaimable quota size value is not greater than or equal to a minimum quota allocation size.

In an embodiment, the balance management component may be configured to reclaim one or more portions of one or more currently active allocated quotas in response to determining that the total reclaimable quota size value is greater than or equal to a minimum quota allocation size. The balance management component may then update the shared account balance to include the reclaimed portions. Thus, the balance management component may reclaim the quota (e.g., service unit allowance, etc.) that was previously allocated to other consumers from the share account balance and add the reclaimed quota to the shared balance account in response to determining that the total reclaimable quota size value is greater than or equal to a minimum quota allocation size. The balance management component may add the reclaimed quota to the shared balance account by incrementing the shared account balance by the number of credits, service access units, service unit allowances, etc. that are included in (or that are represented by) the reclaimed quota.

In an embodiment, the balance management component may be configured to determine a priority value for one or more elements in an eligible quota list. These elements may include, or may be, currently active allocated quotas that are edible for reduction. A currently active allocated quota may be a quota allocated to a consumer from the shared account balance that is being held or used by that consumer (e.g., to receive services from the telecommunication network).

In an embodiment, the balance management component may be configured to sort the eligible quota list based on the determined priority values, and traverse the sorted eligible quota list sequentially (i.e., based on the priorities) to reclaim all or portions of the active allocated quotas. For example, the balance management component may select the first/next element from the sorted list, reduce an allocated quota size of the selected element, and increment the shared account balance by the reduced amount.

In an embodiment, the balance management component may be configured to reevaluate whether the first quota may be allocated to the first consumer from the shared account balance each time the shared account balance is incremented. The balance management component may be configured to continue traversing the list and reducing the allocated quota sizes of the selected elements until all the elements are reduced or until it is determined that the first quota may be allocated to the first consumer without breaching the balance threshold.

In an embodiment, the balance management component may be configured to reduce allocated quota size of the selected element by sending a communication message to a metering and gating component associated with selected element to cause that metering and gating component to return all or portions of its unused allocated quota. In an embodiment, the communication message may cause the metering and gating component to return unused allocated quota that is in excess of the minimum quota allocation size. In other embodiments, the communication message may cause the metering and gating component to return half of its unused allocated quota, or to return half of its unused allocated quota that is in excess of the minimum quota allocation size. In another embodiment, the communication message may cause the metering and gating component to return all unused allocated quota (i.e., the entire portion of unused allocated quota), and the balance management component may respond by sending a second communication message to the metering and gating component associated with selected element to reallocate all or a subset of the returned quota.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106. In the example illustrated in FIG. 1, the communications network 106 includes a network infrastructure 108 unit that encapsulates various network components/systems implementing any of a variety of communication technologies/protocols to process and route the voice, data and control signals to and from the user equipment 102. The network infrastructure 108 unit may include, for example, components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 may also include connections to a policy and charging enforcement function (PCEF) 110 component that is connected to a policy and charging rules function (PCRF) 112 component, online/offline charging systems (OCS/OFCS) 114, and other similar components that participate in, collect information from, or otherwise contribute to, communications between the service network 104 and the user equipment 102. In an embodiment, the PCEF 110 may include a metering and gating component. In an embodiment, the online/offline charging systems (OCS/OFCS) 114 may include an online charging system (OCS) that includes a balance management component. In an embodiment, the OCS/OFCS 114 may be a balance management component.

The PCEF 110 component may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules. The PCEF 110 may also be configured to send signaling information (e.g., control plane information relating to communication setup, security, authentication, charging, enforcement of policy rules, etc.) to the PCRF 112, OCS/OFCS 114, and other similar components.

The PCRF 112 component may be responsible for identifying the appropriate policy and charging rules for a given communication session of a given subscriber or terminal device, and sending the identified policy rules to the PCEF 110 for enforcement. Specifically, the PCRF 112 may be responsible for generating, compiling, and selecting a set of business and technology rules that define the policies that are to be enforced for particular call sessions. The PCRF 112 may make rule decisions on a per-subscriber, per-session and/or per-service basis. For example, the PCRF 112 may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 110 as a profile that defines the policies to be enforced.

In addition to receiving rules from the PCRF 112, the PCEF 110 component may also communicate with the OCS/OFCS 114 to identify the policies that are to be enforced and/or to ensure proper charging. For example, the PCEF 110 may periodically inform the OCS/OFCS 114 of services consumed or requested by a subscriber. The OCS/OFCS 114 may include a balance management component that is responsible for determining if the subscriber has sufficient funds/credits/access units to receive a requested service, and may grant or deny access based on the amount of fund/credits/access units available in a subscriber balance account. For example, the OCS/OFCS 114 may issue a quota by identifying an amount of funds, credits, access units, or service units allowance that are authorized for use by the PCEF 114 for a requested service or consumer.

To focus the discussion on the relevant features and functionalities, various embodiments are described below using 3GPP terminology, and with reference to the Diameter protocol. However, it is to be understood that the various embodiments are network and protocol agnostic, and should not be limited to 3GPP networks, the Diameter protocol, or any specific network technology unless expressly recited as such in the claim language.

Figure 2:
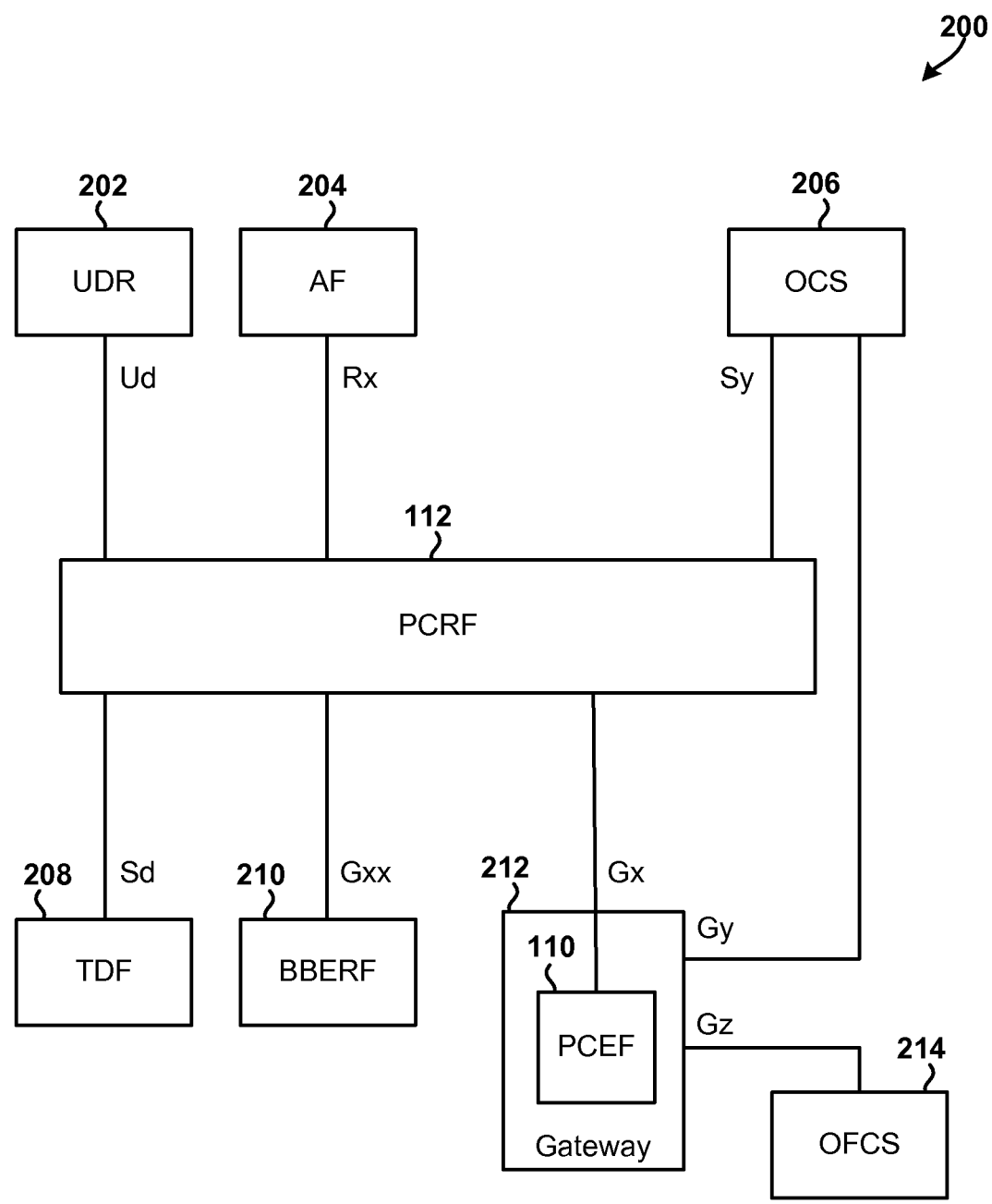

FIG. 2 illustrates various components in a single site deployment of a 3GPP-based policy and charging control (PCC) network 200 that may be configured to perform quota allocation and balance threshold management operations in accordance with various embodiments. In the example illustrated in FIG. 2, the PCC network 200 includes a policy and charging enforcement function (PCEF) 110 component, a policy and charging rules function (PCRF) 112 component, a user data repository (UDR) 202 component, an application function (AF) 204 component, an online charging system (OCS) 206 component, a traffic detection function (TDF) 208 component, a bearer binding and event reporting function (BBERF) 210 component, a gateway 212 component, and an offline charging system (OFCS) 214 component. In an embodiment, the PCEF 110 may be included in the gateway 212 component. In an embodiment, the PCEF 110 component may be a metering and gating component, and the OCS 206 component may be a balance management component.

In an embodiment, the PCRF 112 component may be connected to the UDR 202, AF 204, OCS 206, TDF 208, BBERF 210, and PCEF 110 components via the Diameter Ud, Rx, Sy, Sd, Gxx, and Gx interfaces/reference points, respectively. In an embodiment, the gateway 212 component may be connected to the OCS 206 and OFCS 214 components via the Diameter Gy and Gz interfaces/reference points, respectively.

In an embodiment, the PCEF 110 component may include a metering and gating component (not illustrated in FIG. 2), and the OCS 206 component may include a balance management component (not illustrated in FIG. 2). The metering and gating component may be configured to communicate with the balance management component to provide user equipment devices access to various services based on quotas. As part of these operations, the metering and gating component may send an initial quota allocation request message, a quota allocation update message, and/or a termination message to the balance management component. In various embodiments, the initial quota allocation request message may be a Diameter CCR-I message, the quota allocation update message may be a Diameter CCR-U message, and the termination message may be a CCR-T message. The balance management component may respond to any or all of these messages via the appropriate response message, such as a quota allocation response message or a Diameter CCA message.

The metering and gating component and the balance management component may, individually or collectively, perform various quota allocation management operations, which may include implementing one or more quota allocation management schemes. These schemes may include a hard limit scheme, a session priorities scheme, a session profiles scheme, a minimum quota allocation scheme, a maximum threshold overrun scheme, a quota return scheme, and a threshold breach timer scheme.

In an embodiment, the components may be configured to implement a hard limit scheme in which a balance threshold is enforced based on a reserved (rather than a consumed) quota. Sessions may be terminated or redirected when there is no remaining quota available for allocation, which may result in some sessions being terminated in advance of their entire balance being consumed. As such, in an embodiment, the components may be configured to use quota return messages to share remaining unused portions of an allocated quota across the active consumers (e.g., services, sessions, subscribers, etc.) that are associated with a shared account balance.

In an embodiment, the components may be configured to implement a session priorities scheme in which sessions associated with a shared account balance are prioritized, and these priorities are used to determine which of the sessions are to be allocated quota when the shared balance is low. For example, sessions for an account's primary subscriber may be given a higher priority, and thus given preferential treatment for quota allocations. Similarly, services within a session may be prioritized under this scheme.

In an embodiment, the components may be configured to implement a session profiles scheme in which sessions are categorized in terms of bandwidth requirements of the service being consumed. This allows the components to allocate quota according to the particular requirements of the service being used, rather than simply splitting quota evenly across multiple sessions. In various embodiments, the session profile may be defined based on the characteristics of a session, such an access point name (APN), radio access technology (RAT), rating group (or service), subscriber location, and/or subscriber profile attributes.

In an embodiment, the components may be configured to implement a minimum quota allocation scheme. That is, some schemes may require that the sizes of the quota allocations be reduced as a threshold is approached. The components may implement the minimum quota allocation scheme (e.g., along with another scheme) to define minimum quota allocation sizes so as to prevent the sizes of the quota allocations from being reduced to a level that causes excessive signaling traffic in the network.

In an embodiment, the components may be configured to implement a maximum threshold overrun scheme that allows a balance threshold to be overrun by a specified tolerance value (T) before a balance threshold breach flag is set or a balance threshold breach action is triggered. The tolerance value (T) may be an absolute value or a percentage of a balance threshold. The maximum threshold overrun scheme allows the components to prevent the total amount of quota that is reserved below the balance threshold from exceeding the specified tolerance value (T) across all the active sessions. By permitting the balance threshold to be overrun, the various embodiments create a window during which a threshold breach may be detected and reported via normal signaling communications. This may be accomplished without having to significantly reduce the quota allocations, or to communicate large volumes of signaling information (e.g., via usage report requests) or perform additional operations to explicitly detect the threshold breach.

In an embodiment, the components may be configured to implement a quota return scheme in which the components retrieve and use an existing quota allocation from one consumer (e.g., service, session, or subscriber) to satisfy a quota allocation request from another consumer so as to consume a left-over or remaining quota allocation down to a threshold before causing/triggering a threshold breach.

In an embodiment, the components may be configured to implement a threshold breach timer scheme. That is, if there are no reports detailing the amount of the allocated quota that is consumed and/or unused from the metering and gating component for a time period (e.g., due to idle sessions), a balance threshold breach may go undetected. Under this scheme, a timer is used to prompt the balance management component to regularly retrieve quota allocation reports from the metering and gating components. This scheme may be implemented along with another scheme to ensure that a timely notification is sent. In an embodiment, the components may be configured to disable the timer or threshold breach timer scheme in response to determining that a hard limit scheme is being used.

In an embodiment, the balance management component may be configured to perform dynamic quota allocation operations in response to determining that a quota allocation request message has been received for a consumer (e.g., services, sessions, subscribers, etc.) that is associated with a shared account balance, and that the shared balance is sufficiently close to a balance threshold so that allocating the quota would cause the shared balance to breach the balance threshold (e.g., the zero units threshold would be breached when a quota allocation request for 50 units is received for a shared balance is that is 47 units). As part of these operations, the balance management component may determine the total amount of quota (e.g., amount of pre-allocated funds, credits, access units, or service units allowance) that is currently allocated to all metering and gating components for the shared account balance, identify consumers associated with the shared balanced account for which existing quota allocations may be reduced without violating their minimum quota allocation requirements, reduce or reclaim the quota allocated to the identified consumers, and use the reclaimed quota to allocate quota (i.e., by allocating the funds, credits, access units, or service units allowance, etc.) to the consumer associated with the received quota allocation request message.

In an embodiment, the balance management component may be configured to generate a list of eligible quota allocations (i.e., an eligible quota list) that includes information suitable for identifying existing quota allocations that are eligible for reduction. In a further embodiment, the balance management component may be configured to organize or prioritize the eligible quota list. The balance management component may be configured to determine that an existing quota allocation is eligible for reduction and/or to determine the priority of an eligible quota allocation for reduction based on any or all of a number of factors, including the actual quota allocation size, the size of the difference between the minimum quota allocation and the actual quota allocation, the expiry time of the quota allocation (i.e., the quota allocation's age), the types of the subscribers (e.g., reclaim quota allocation from a child's account so that the parent can continue to use services, or reclaim quota allocation from low-level employees so that managers/executives can start sessions), the types of the sessions, and the types of services (e.g., file transfer services may have a lower priority than VoIP services, personal services such as social networking may have lower priorities than corporate services such as sales tools and VPNs).

In an embodiment, the balance management component may be configured to select the quota allocations that are to be reduced, such as from the sorted eligible quota list, based on business rules. For example, the balance management component may be configured to use business rules to determine whether to reduce a small number of eligible quota allocations by large amounts or to reduce a large number of eligible quota allocations by small amounts. The reductions may be applied to the eligible quota allocation relative to the size of the eligible quota allocation (e.g., half of the allocated quota) or by a fixed amount (e.g. 100 KB). In an embodiment, the balance management component may be configured to not reduce an eligible allocated quota if the reduction will cause the quota allocation to be less than the minimum quota allocation defined for that service, session, or subscriber.

Figure 3A:
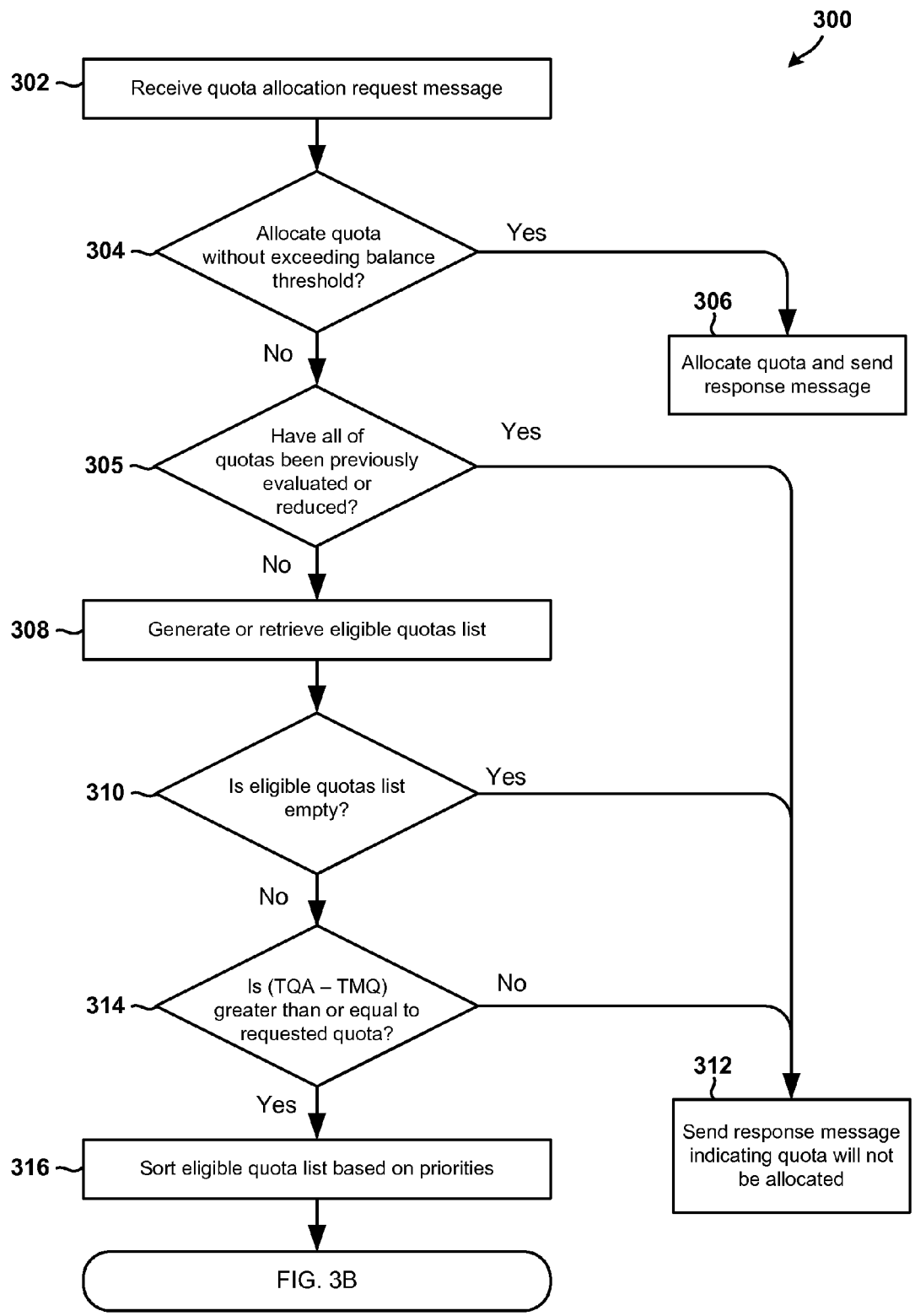
FIGS. 3A and 3B are process flow diagrams illustrating a method for intelligently reducing quota allocation sizes in accordance with an embodiment.
Figure 3B:
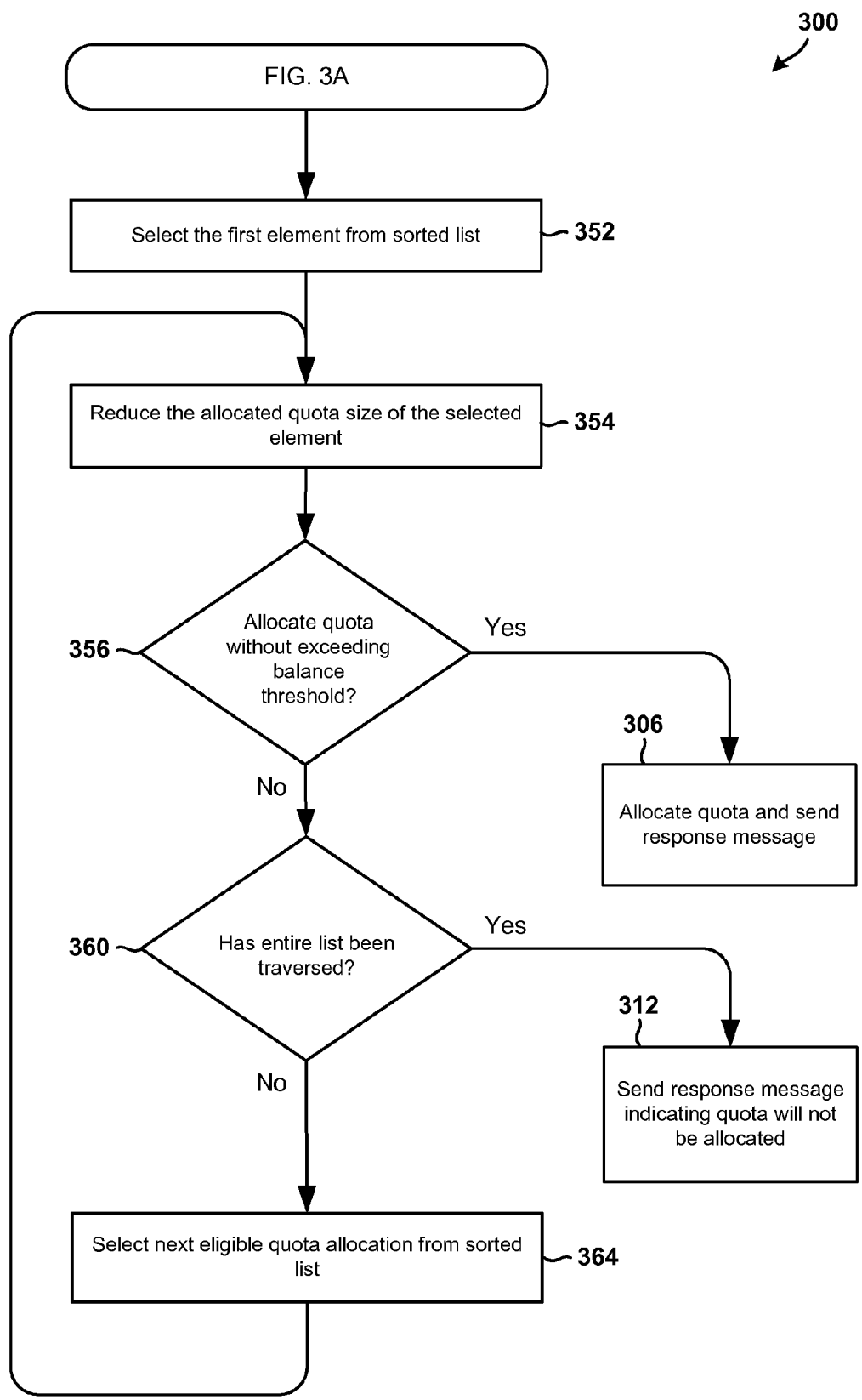

FIGS. 3A and 3B illustrate a method 300 of intelligently reducing quota allocation sizes in accordance with an embodiment. Method 300 may be performed in a processing core of a server computing device that implements all or portions of a balance management component that maintains a balance account that is shared by multiple consumers (e.g., across services, sessions, and/or subscribers).

In block 302, the processing core of the balance management component may receive a quota request message (e.g., an initial quota allocation request message, an update quota request message, etc.) from a metering and gating component, determine whether the received request is associated with an ongoing session (i.e., an update request), add any unused portions of the allocated quota (e.g., allocated funds, credits, access units, or service units allowance) to the available balance, and/or add the amount of the allocated quota that has been consumed to a running total (e.g., for billing and reporting purposes). In the example illustrated in FIGS. 3A and 3B, in block 302, the balance management component also determines that the received quota request message includes a request for the allocation of quota.

In determination block 304, the balance management component may determine whether quota (e.g., credits, access units, etc.) may be allocated without exceeding a balance threshold. For example, the balance management component may determine whether the remaining balance in the balance account is greater than or equal to a quota allocation size value included in the received message or to a minimum quota allocation size value that is associated with the received message or its associated consumer (e.g., service, session, subscriber, etc.).

In response to determining that quota may be allocated without exceeding a balance threshold (i.e., determination block 304="Yes"), in block 306, the balance management component may allocate quota by decrementing the user's available balance (or by reserving part of the available balance so that it is not available for future allocation), generating a quota allocation response message that includes an allocated quota size (e.g., amount of pre-allocated funds, credits, access units, or service units allowance), and sending a quota allocation response message to the metering and gating component. In an embodiment, the balance management component may be configured to generate the quota allocation response message to include a quota information structure and/or information suitable for use in identifying various characteristics and features of the allocated quota, such as the allocated quota size, expiration time, location or address of the metering and gating component, the consumer to which the quota was allocated, etc. The balance management component may also be configured to add the quota information structure or information identifying the characteristics of the allocated quota to an active quota allocations list or to an eligible quota list.

In response to determining that quota may not be allocated without exceeding a balance threshold (i.e., determination block 304="No"), in determination block 305, the balance management component may determine whether all of the relevant quotas have previously been evaluated or reduced. In response to determining that all of the relevant quotas have previously been evaluated or reduced (i.e., determination block 305="Yes"), in block 312, the balance management component may send a response message to the metering and gating component indicating that quota will not be allocated. In an embodiment, in block 312, the balance management component may determine whether there is sufficient balance available to support the quota allocation, allocate the quota if the balance is sufficient, and send the response message to the metering and gating component indicating that quota will not be allocated in response to determining that the balance is not sufficient.

In response to determining that all of the relevant quotas have not yet been evaluated or reduced (i.e., determination block 305="No"), in block 308, the balance management component may generate or retrieve a list of eligible quota allocations (i.e., the eligible quota list) that includes information identifying existing quota allocations that are eligible for reduction. In an embodiment, the balance management component may determine that an existing quota allocation is eligible for reduction (and thus suitable for inclusion in the eligible quota list) based on determining that the quota has been allocate to a consumer that is associated with the shared account balance, that the allocated quota size (i.e., amount of allocated funds, credits, access units, or service units allowance) is greater than a minimum quota allocation size, etc.

In determination block 310, the balance management component may determine whether any of allocated quotas for consumers associated with the shared account balance are eligible for reduction by determining whether the eligible quota list is empty. In response to determining that the eligible quota list is empty (i.e., determination block 310="Yes"), in block 312, the balance management component may send a response message to the metering and gating component indicating that quota will not be allocated.

In response to determining that the eligible quota list is not empty (i.e., determination block 310="No"), in determination block 314, the balance management component may determine whether the total quota currently allocated (TQA) to all consumers of the shared account balance less the total minimum quota currently allocated (TMQ) to all the consumers is greater than or equal to the requested quota allocation size or the minimum quota allocation size. For example, in determination block 314, the balance management component may compute a total reclaimable quota (TRQ) size value by identifying the active quotas that were allocated from the shared account balance, determining the current quota allocation sizes and the minimum quota sizes of the identified active quotas, computing a total quota allocation (TQA) size value based on the determined current quota allocation sizes, and computing a total minimum quota (TMQ) size value based on the determined minimum quota sizes, and setting the value of the total reclaimable quota (TRQ) size value to be equal to the difference between the total quota allocation (TQA) size value and total minimum quota (TMQ) size value. The balance management component may then determine whether the total quota currently allocated (TQA) to all consumers of the shared account balance less the total minimum quota currently allocated (TMQ) to all the consumers is greater than or equal to the requested quota allocation size or the minimum quota allocation size by determining whether the total reclaimable quota (TRQ) size value is greater than or equal to a requested quota allocation size and/or to a minimum quota allocation size.

In response to determining that TQA minus TMQ is not greater than or equal to the requested or minimum quota allocation size (i.e., determination block 314="No"), in block 312, then the balance management component may send a response message to the metering and gating component so as to indicate that quota will not be allocated.

In response to determining that TQA minus TMQ is greater than or equal to the requested or minimum quota allocation size (i.e., determination block 314="Yes"), in block 316, the balance management component may determine a priority value for each element in the eligible quota list, and organize, filter, and/or sort the eligible quota list (e.g., based on the determined priorities). The balance management component may determine these priorities and sort the list based on any combination of factors or criteria, including the actual quota allocation size, the size of the difference between the minimum quota allocation and the actual quota allocation, quota expiry time, subscriber type, session type, and service type. The balance management component may sort the eligible quota list so that the quota allocations that are closer to the front of the list will be reduced before quota allocations that are closer to the end of the list, or vice versa.

With reference to FIG. 3B, in block 352 of method 300, the balance management component may select the first element from the sorted/ordered eligible quota list. In block 354, the balance management component may reduce the quota allocation size of the selected element. In an embodiment, this may be accomplished by requesting that the metering and gating component associated with selected element reduce its quota allocation size and/or return unused allocated quota that is in excess of its minimum quota allocation size, and updating the shared account balance to include the reclaimed quota. In other embodiments, this may accomplished by reducing the allocated quota size by half, by half of the allocated quota that is in excess of the minimum quota allocation size, etc. For example, the balance management component may be configured to request that the component associated with selected element reduce its allocated quota size by half in response to determining that the quota allocation size of the selected element is a multiple of a minimum quota allocation.

In determination block 356, the balance management component may determine, based on the updated balance information, whether the requested or required quota may be allocated without exceeding a balance threshold. For example, in determination block 356, the balance management component may determine whether the updated balance in the balance account is now greater than or equal to a quota allocation size value included in the received message, a fixed quota allocation size, and/or to a minimum quota allocation size.

In response to determining that quota may be allocated without exceeding a balance threshold (i.e., determination block 356="Yes"), in block 306, the balance management component may allocate the quota by decrementing the user's available balance (or by reserving part of the available balance so that it is not available for future allocation), generating a quota allocation response message that includes an allocated quota size, and sending the quota allocation response message to the metering and gating component.

In response to determining that quota may not be allocated without exceeding a balance threshold (i.e., determination block 356="No"), in determination block 360, the balance management component may determine whether all the elements in the eligible quota list have been evaluated or reduced. In an embodiment, this may be accomplished by determining whether the entire list has been traversed. In response to determining that all the elements in the eligible quota list have been evaluated or reduced (i.e., determination block 360="Yes"), in block 312, the balance management component may send a response message to the metering and gating component indicating that quota will not be allocated. In response to determining that all the elements in the eligible quota list have not yet been evaluated or reduced (i.e., determination block 360="No"), in block 364, the balance management component may continue traversing the list, select the next element from the list, and reduce the allocation size of the selected element in block 354. The operations of blocks 354-364 may be repeated until an appropriate response message is sent in one of blocks 306 and 312.

As discussed above, in determination block 314, the balance management component may determine whether the total quota currently allocated (TQA) to all consumers of the shared account balance less the total minimum quota currently allocated (TMQ) to all the consumers is greater than or equal to the requested quota allocation size or the minimum quota allocation size. In an embodiment, the balance management component may compute the TQA value by adding the quota allocation sizes of the all quotas that are currently allocated to consumers of the shared account balance. For example, if there are quota allocations of 1,000 KB for voice-over-IP, 250 KB for web browsing, and 100 KB for email, then the balance management component may determine the TQA value to be 1,000 KB+250 KB+100 KB=1,350 KB. If the minimum quota allocations are 500 KB for voice-over-IP, 100 KB for web browsing, and 100 KB for email, then the balance management component may determine the TMQ value to be 500 KB+100 KB+100 KB=700 KB. Thus, the TQA minus the TMQ would be 1,350 KB−700 KB=650 KB.

In the above example, if the requested quota allocation size is 500 KB, then the balance management component will be able to allocate this quota because 500 KB is less than TQA minus TMQ (i.e., less than 650 KB). If the requested quota allocation size is 800 KB and the minimum quota allocation size is 400 KB, then the balance management component would be able to allocate an amount of quota between the minimum quota allocation and the TQA minus TMQ inclusive (i.e., between 400 KB and 650 KB inclusive). If the requested quota allocation size is 800 KB, and the minimum quota allocation size is also 800 KB, then the balance management component will not be able to allocate this quota because 650 KB is less than 800 KB.

In an embodiment, the balance management component may be configured so that quota allocations are granted at a pre-defined default size (as defined in the configuration of the session profile) for each received request message (e.g., CCR message) until the remaining available balance plus the total maximum quota allocations for the shared balance is equal to or less than the total number of active sessions using the shared balance multiplied by the largest quota allocation. After the above condition is met, the balance management component may perform quota allocation size halving operations to reduce the quota allocation sizes by half for all of the active sessions that have a quota allocation that is greater than half of the largest quota allocation. Then, for each subsequent request message (e.g., CCR message) that is received, the balance management component may send a response message (e.g., RAR message) relating to the appropriate active sessions that satisfy the above quota allocation condition and halve the oldest reported usage (as reported in a CCR-U message), until the quota allocation is halved for all appropriate active sessions. The balance management component may continue allocating quotas for each request message (e.g., CCR message) that is received until the remaining balance is equal to (or less than) the total number of active sessions multiplied by the largest quota allocation.

In addition, the balance management component may be configured so that the quota allocation size halving operations are performed until the quota allocation sizes are low enough to reach a defined tolerance precision (e.g., the total number of active sessions multiplied by the largest quota allocation size has to be less than 2% of the total shared balance size) or until further quota allocation size halving is not possible (the minimum quota allocation size has been set for all active sessions). When one of the above conditions is met, the quota allocation operations may continue at the quota allocation size for each request message (e.g., CCR message) until the balance threshold is breached. The balance management component may send a "policy refresh" request message to its corresponding PCRF 122 component (e.g., via Sy signaling) when the next request message is received for an active session relating to the shared balance.

Figure 4:
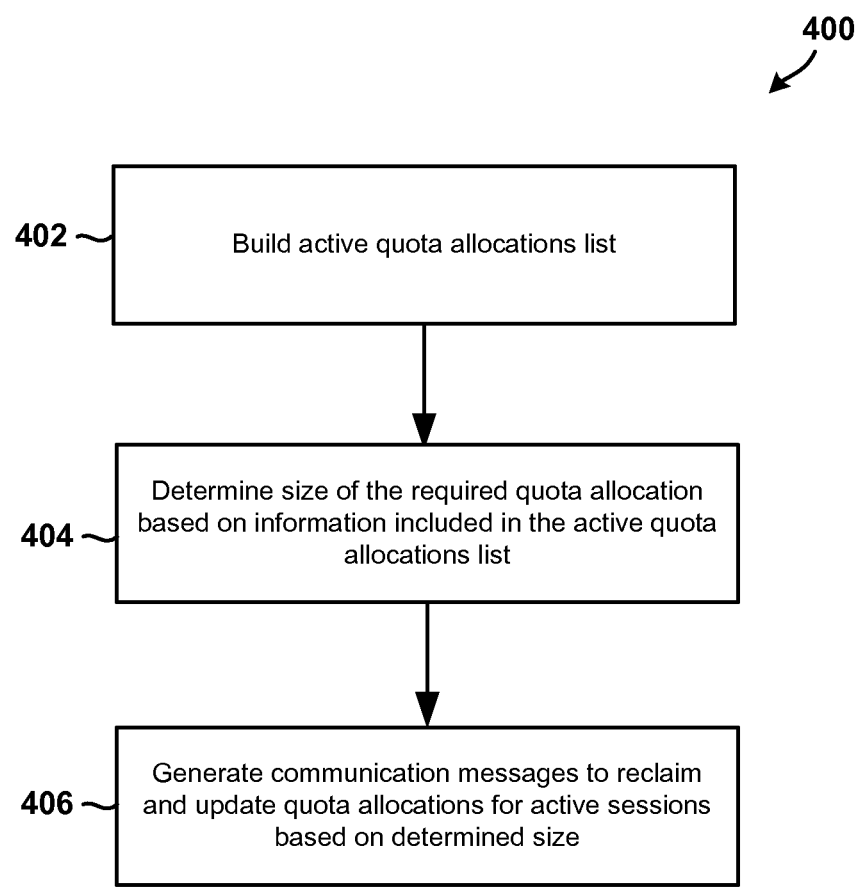
FIG. 4 is a process flow diagram illustrating an embodiment method of reclaiming and updating quota allocations for active sessions.

FIG. 4 illustrates an embodiment method 400 of reclaiming and updating quota allocations for active sessions. Method 400 may be performed in a processing core of a server computing device that implements all or portions of a balance management component. In block 402, a processing core in the balance management component may build or update an active quota allocation list.

The active quota allocation list may include information suitable for determining the total number of active sessions that are using or that are associated with a shared account balance, the total maximum quota allocations for the shared balance, and the largest quota allocation. In an embodiment, the active quota allocation list may be equal to or the same as the eligible quotas list. In various embodiments, the eligible quotas list may include all or a subset of the elements included in the active quota allocation list. In various embodiments, the active quota allocation list and/or eligible quotas list may include information suitable for identifying all of the active quotas that were allocated from a shared account balance, and may include the current quota allocation sizes and/or minimum quota sizes of the active quotas.

In block 404, the balance management component may determine the size of a required quota allocation based on the information included in the active quota allocation list. In block 406, the balance management component may generate and send communication messages to reclaim and update quota allocations for active sessions based on the determined size.

Figure 5:
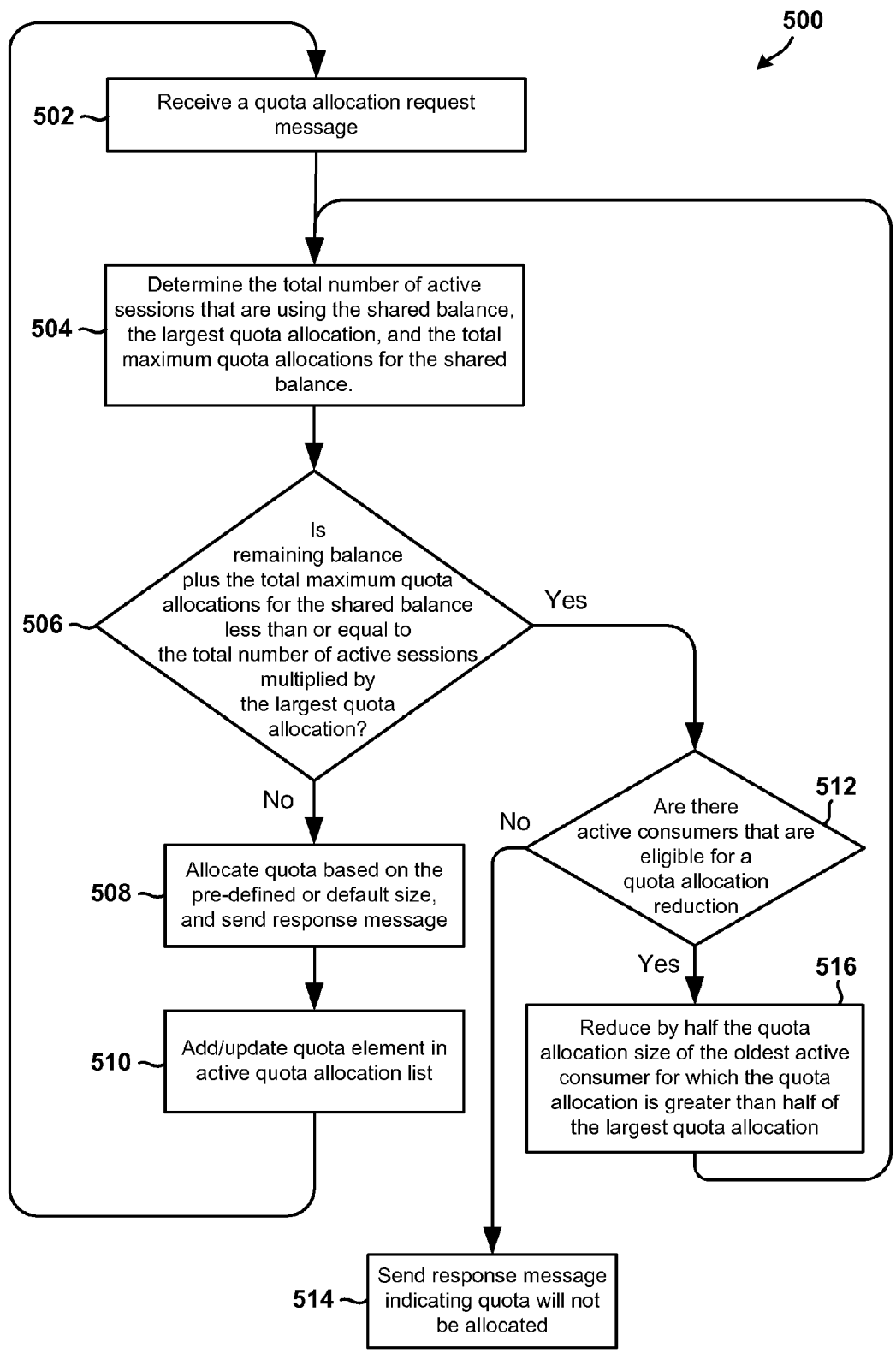
FIG. 5 is a process flow diagram illustrating an embodiment method of dynamically determining the quota allocation sizes for active consumers associated with a single shared account balance.

FIG. 5 illustrates an embodiment method 500 of dynamically determining the quota allocation sizes for active consumers of a shared balance. Method 500 may be performed in a processing core of a server computing device that implements all or portions of a balance management component.

In block 502, the balance management component may receive a quota allocation request message (e.g., CCR message). In block 504, the balance management component may determine the total number of active consumers (e.g., active sessions) that are using the shared account balance, the largest amount of quota allocated to an active consumer using the shared account balance, and the total maximum quota allocations for the shared account balance. In an embodiment, this may be accomplished by traversing an active quota allocation list that stores quota information suitable for identifying the characteristics of the each active quota allocation or each active consumer for which quota has been allocated.

In determination block 506, the balance management component may determine whether an existing quota allocation should be resized by determining whether the remaining available balance plus the total maximum quota allocations for the shared balance is less than or equal to the total number of active sessions using the shared balance multiplied by the largest quota allocation. In response to determining that the existing quota allocations should not be resized (i.e., determination block 506="No"), in block 508, the balance management component may allocate a quota for the received message based on a pre-defined or default size. In block 510, the balance management component may update the active quota allocation list to include the allocated quota. The balance management component may continue receiving messages, allocating quotas, and updating the active quota allocation list in blocks 502-510 until the remaining available balance plus the total maximum quota allocations for the shared balance is equal to or less than the total number of active consumers using the shared balance multiplied by the largest quota allocation (i.e., determination block 506="Yes").

In response to determining that an existing quota allocation should be resized (i.e., determination block 506="Yes"), in determination block 512, the balance management component may determine whether there are any active quota allocations or active consumers that are eligible for a quota allocation reduction. In an embodiment, the balance management component may determine that there are no active consumers/quota allocations that are eligible for reduction based on determining that allocated quotas have previously been reduced for all the suitable active consumers.

In response to determining that there are no active quota allocations or active consumers that are eligible for a quota allocation reduction (i.e., determination block 512="No"), in block 514, the balance management component may send a response message to the metering and gating component that is associated with the received message to indicate that quota will not be allocated for that consumer.

In response to determining that there is an active quota allocation or active consumer that is eligible for a quota allocation reduction (i.e., determination block 512="Yes"), in block 516, the balance management component may reduce by half the quota allocation size of the oldest active consumer (e.g., the active session that has held a quota allocation for the longest time) for which the quota allocation is greater than half of the largest quota allocation. The balance management component may then repeatedly perform the operations of blocks 504. 506, 512, and 514 until it determines that none of the existing quota allocations should be resized (i.e., determination block 506="No") or that none of the remaining active consumers are eligible for a quota allocation reduction (i.e., determination block 512="No").

For distributed balance management components in which updates to a single shared balance may occur in multiple balance management components in geographically dispersed sites, locking the shared balance may cause high latencies and may be complex to manage. More importantly, there may be adverse business impacts (e.g., revenue loss) arising from allowing shared balances to breach thresholds. As such, the various embodiments include methods, and computing devices configured to implement the methods, of maintaining the speed of transactional updates to shared balances so as to reduce or prevent inadvertent balance threshold breaches, reduce latency, and improve the performance of the telecommunication system.

For example, a balance management component may be configured to maintain the speed of transactional updates to shared balances while mitigating or preventing the risk of balance threshold breaches. The balance management component may compute a balance change rate value that identifies the rate in which the shared account balance is being updated, modified, or changed. The balance management component may serialize subsequent updates to that shared account balance based on the balance change rate value so as to prevent an inadvertent threshold breach. The balance management component may perform these operations for prepaid monetary balances for individuals or groups, for non-monetary subscriber balances (e.g., family data allowances), etc.

In an embodiment, each of the multiple balance management components may retain/store a copy of a shared account balance. Under normal circumstances, each balance management component may interact with the shared account balance (e.g., reads the balance, updates the balance, etc.) as if the balance is stored locally. Thus, the transaction processing performance and data storage updates may be performed at local data centre speeds during normal system operation.

Since multiple balance management components in geographically dispersed sites may access and update the shared account balance, the balance management components may be configured so that balance updates are replicated and/or communicated asynchronously to all of the multiple balance management components. A single balance management component may act as the owner of each balance (i.e., each balance has a homed balance management component), and balances may be distributed or domained across the multiple balance management components. For a defined sampling period, each balance management component may collate all the transactions for the balances that it owns, and then determine a balance change rate value that identifies the rate at which each balance is changing.

In an embodiment, the balance management components may be configured to use linear interpolation to determine the balance change rate value, and to determine, estimate, or predict when the shared account balance will breach a balance threshold (e.g., a 500 units balance threshold, a zero balance threshold, etc.). When the shared account balance is modified or updated, the balance management component may compute the balance change rate value using the following formula:

$$m = \left\{ \frac{(y_2 - y_1)}{(x_2 - x_1)} \right\}$$

where $x_1$, $x_2$ are times at which balance updates occurred and $y_1$, $y_2$ are previous and current balance values The balance management component may average the set of values for m for each balance periodically, and calculate one or more estimated threshold breach times. Alternatively, the balance management component may determine the rate of change of the balances using any suitable algorithm that is known in the art.

Given that each balance may be updated in multiple active balance management components, various embodiment components may be configured to determine which of the balance management components is the most active in terms of frequency and/or magnitude of updates to the balance. The estimated threshold breach times and most active balance management component information for each balance may then be communicated to each balance management component. Each balance management component may continue to operate independently on that balance until an estimated breach time is reached.

As the balance updates continue to occur at each balance management component, the next estimated breach time may be compared with the current time. Once the difference between these two values is within a defined tolerance range for that balance, the balance management component that is identified as the authoritative component (e.g., the most active balance management component for that balance) may take over exclusive access to that balance. The other balance management components may then route balance update transactions for processing to the authoritative balance management component for that balance. Once the threshold is breached, the authoritative balance management component may update the balance on all of the other balance management components, and the authoritative balance management component may relinquish its exclusive access to that balance. Each balance management component may then resume processing balance updates until the next estimated breach time is approached.

Figure 6:
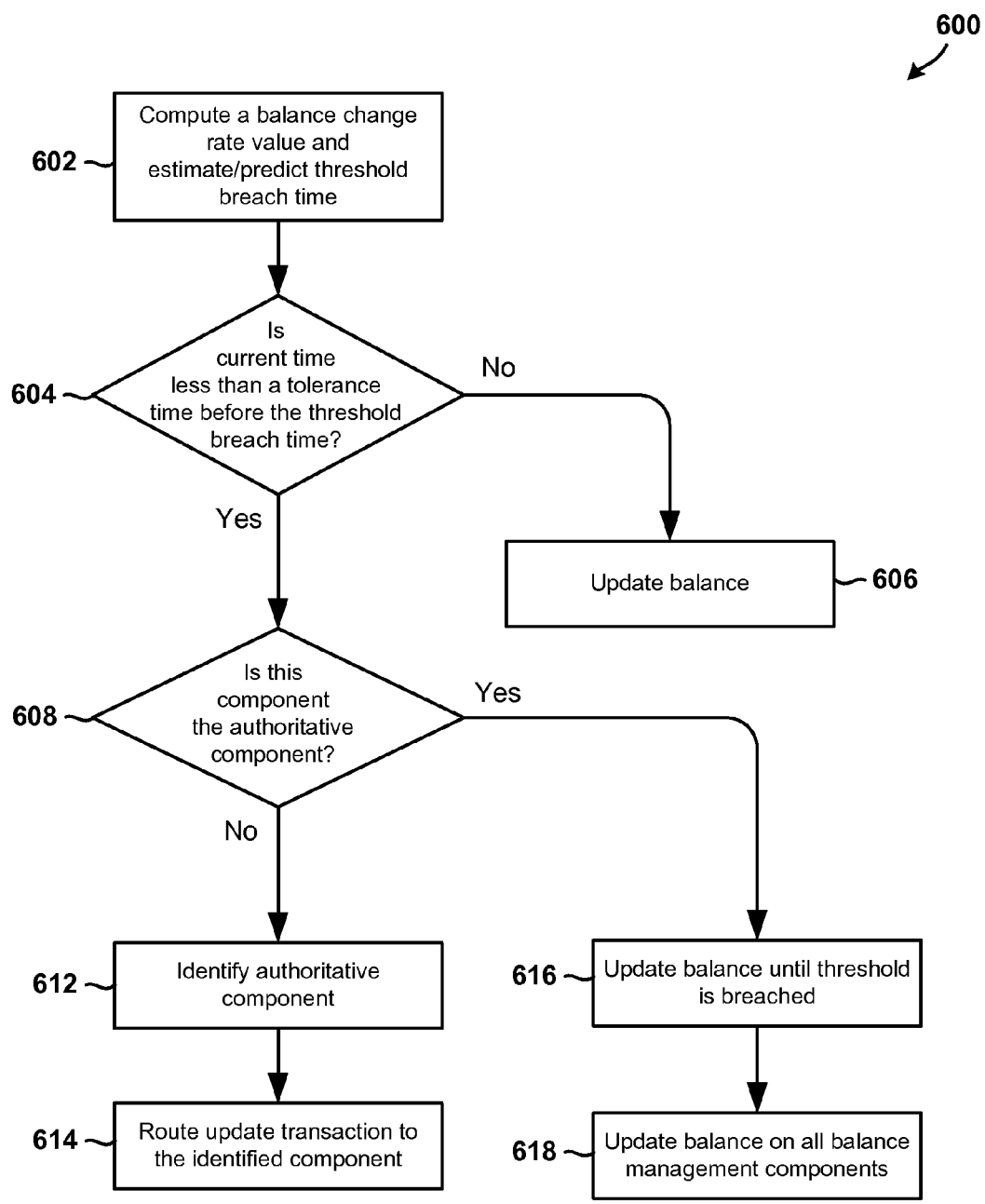
FIG. 6 is a process flow diagram illustrating an embodiment method of updating a shared account balance so as to prevent inadvertent balance threshold breaches.

FIG. 6 illustrates an embodiment method 600 of maintaining the speed of transactional updates to a shared account balance so as to reduce or prevent balance threshold breaches. Method 600 may be performed by processing cores in one or more server computing devices, each of which may include all or portions of a balance management component. In an embodiment, method 600 may be performed in response to determining that a shared account balance requires updates or modification, such as in response to receiving a quota allocation request message, in response to reclaiming allocated quota, or in response to receiving a balance update transaction or request from another balance management component.

In block 602, a balance management component may compute a balance change rate value for a shared account balance, and estimate or predict a threshold breach time (i.e., when the shared account balance will breach a balance threshold) based on the balance change rate value. In an embodiment, the balance management component may use linear interpolation to compute the balance change rate value for the shared account balance. In an embodiment, the shared account balance may be a distributed balance that is used by multiple balance management components that are in geographically dispersed sites. In an embodiment, each of the multiple balance management components may retain/store a copy of a shared account balance.

In determination block 604, the balance management component may determine whether the current time is less than a tolerance time before the threshold breach time. In response to determining that the current time is not less than a tolerance time before the estimated/predicted threshold breach time (i.e., determination block 604="No"), in block

606, the balance management component may update the shared account balance by updating the copy of the balance that is stored in its local memory. In an embodiment, information regarding the balance update may be communicated asynchronously to all balance management components that access or use the shared account balance.

In response to determining that the current time is not less than a tolerance time before the threshold breach time (i.e., determination block 604="Yes"), in determination block 608, the balance management component may determine whether it is an authoritative component that has exclusive access to the shared account balance, such as by determining whether it is the most active component that accesses or uses the shared balance account in terms of frequency and/or magnitude of updates to the balance.

In response to determining that balance management component is the authoritative component (i.e., determination block 608="Yes"), in block 616, the balance management component may update the database until the balance threshold is breached. In block 618, the balance management component may perform various operations to synchronize or update the shared account balance information stored in the local memories of all balance management components associated with the shared account balance.

In response to determining that balance management component is not the authoritative component (i.e., determination block 608="No"), in block 612, the balance management component may identify another balance management component that is the authoritative component. In block 614, the balance management component may route the database update transaction to the balance management component identified as being the authoritative component. The authoritative balance management component may then perform the operations of blocks 616 to 620 discussed above.

Various embodiments may include components configured to use session prioritization to determine which specific sessions are granted quota in a low balance condition and which sessions are denied. For example, sessions for the primary account holder for a group account may have a higher priority than sessions for other subscribers within that group.

Various embodiments may include components configured to categorize sessions in terms of the services, or types of services, being delivered and consumed within each session, and allocate quota based on the specific requirements of the specific service being consumed. This provides a more intelligent way of allocating quota, rather than granting equal quota amounts to each session.

In the various embodiments, a specific shared services threshold and quota allocation algorithm may be defined in order to achieve "as close as possible" threshold breach notifications for large shared balances.

Quota consumed on full speed quality of service (QoS) for shared service groups may be between 100% and a defined percentage (i.e., the tolerance value) of the shared balance size. This may be described using the following equation that tests whether the granted quota allocation size needs to be decremented:

(T*Shared Balance Size)>(M*Largest Granted Quota Allocation Size)

where M={Number of active Rating Groups across all sessions}
T={the configured Tolerance value}

As an example, consider a family of five subscribers who share a balance of 10 GB. Each of the members has active sessions, with each session having two rating groups. The defined default (and largest) quota allocation size for both rating groups is 10 MB. Assuming a tolerance value of 2% in this case, there is no need for any decrementing of the granted quota allocation size, because applying these values to the above equation gives:

(2%*10 GB)>(5*2*10 MB).

As another example, consider a family of five subscribers who share a balance of 1 GB. Each of the members has active sessions, with each session having two rating groups. The defined default (and largest) quota allocation size for both rating groups is 10 MB. Assuming a tolerance value of 2% in this case, applying these values to the above equation gives:

(2%*1 GB)>(5*2*10 MB), which fails the test

Therefore, in this example the granted quota allocation size would have to be decremented (for example, by halving until this condition is satisfied, as shown:

(2%*1 GB)>(5*2*1.25 MB), which passes the test

The formula provided below enables the determination of the algorithm's precision for a given set of input parameters. In the majority of the cases, the tolerance values may be greater than the output value of the formula. However in some edge cases (for example, very small granted quota sizes and many concurrent active sessions and rating groups) the output value of the formula may be greater than the tolerance value, meaning that the shared balance threshold is at risk of being exceeded by that percentage amount.

$$\text{Maximum Quota Consumed} = \text{Max}\left\{\left(\frac{\text{Shared } Bal. \text{ Size} + \sum_{i=1}^{N}\sum_{j=1}^{M_i} \text{Min. Allocation } Size_{(Session_i; Rating\ Group_j)}}{\text{Shared Balance Size}}\right) * 100; T\right\}$$

where $N =$

{Number of active sessions for the Shared Services Group}

$M_i = $ {Number of active Rating Groups within $Session_i$}

$T = $ {the specified Tolerance value}

As an example, consider a shared services group with 100 MB total quota, ten members, one session each with one rating group, and a minimum allocation size is set to 10 KB. In this example, the formula for determining the algorithm's precision becomes:

$$\text{Maximum Quota Consumed} = \text{Max}\left\{\left(\frac{100\ MB + 10*1*\frac{1*0.01\ MB}{100\ MB}}{100\ MB}\right)*100; 102\right\}$$

$$= \text{Max}\{100.1; 102\}$$

$$= 102$$

Thus quota consumed will be between 100%-102% of 100 MB. Note that although 100%-100.1% precision could be reached by decreasing the allocation sizes until the minimum of 10 kilobytes is reached, the aim is to maintain acceptable system performance (by not going down to the minimum allocation size and thus sending fewer RARs) while the precision is still kept within the acceptable range of 100-102%.

In an additional example, consider a shared services group with 100 MB total quota, 250 members, one session each with 4 rating groups, and a minimum allocation size is set to 10 kilobytes. In this example, the formula for determining the algorithm's precision becomes:

$$\text{Maximum Quota Consumed} = \text{Max}\left\{\left(\frac{\frac{100\ MB + 250*1*}{4*0.01\ MB}}{100\ MB}\right)*100; 102\right\}$$
$$= \text{Max}\{110; 102\}$$
$$= 110$$

Thus quota consumed will be between 100%-110% of 100 MB. Note that this is the maximum precision reachable (for this edge case) by decreasing the allocation sizes to the minimum size of 10 kilobytes, since in the (highly unlikely) worst case scenario, when breaching the 100 MB balance size, all 250*4 rating groups will have 10 kilobytes quota allocated, and 99.99% used.

In an enhanced embodiment, session prioritization may be further used to determine which specific sessions are granted quota in a low balance condition, and which sessions are denied. For example, sessions for the primary account holder for a group account may have a higher priority than sessions for other subscribers within that group.

In an enhanced embodiment, sessions may be categorized in terms of the services being delivered and consumed within each session, and quota may be allocated based on the specific requirements of the specific service being consumed. This provides a more intelligent way of allocating quota, rather than granting equal quota amounts to each session.

Figure 7:
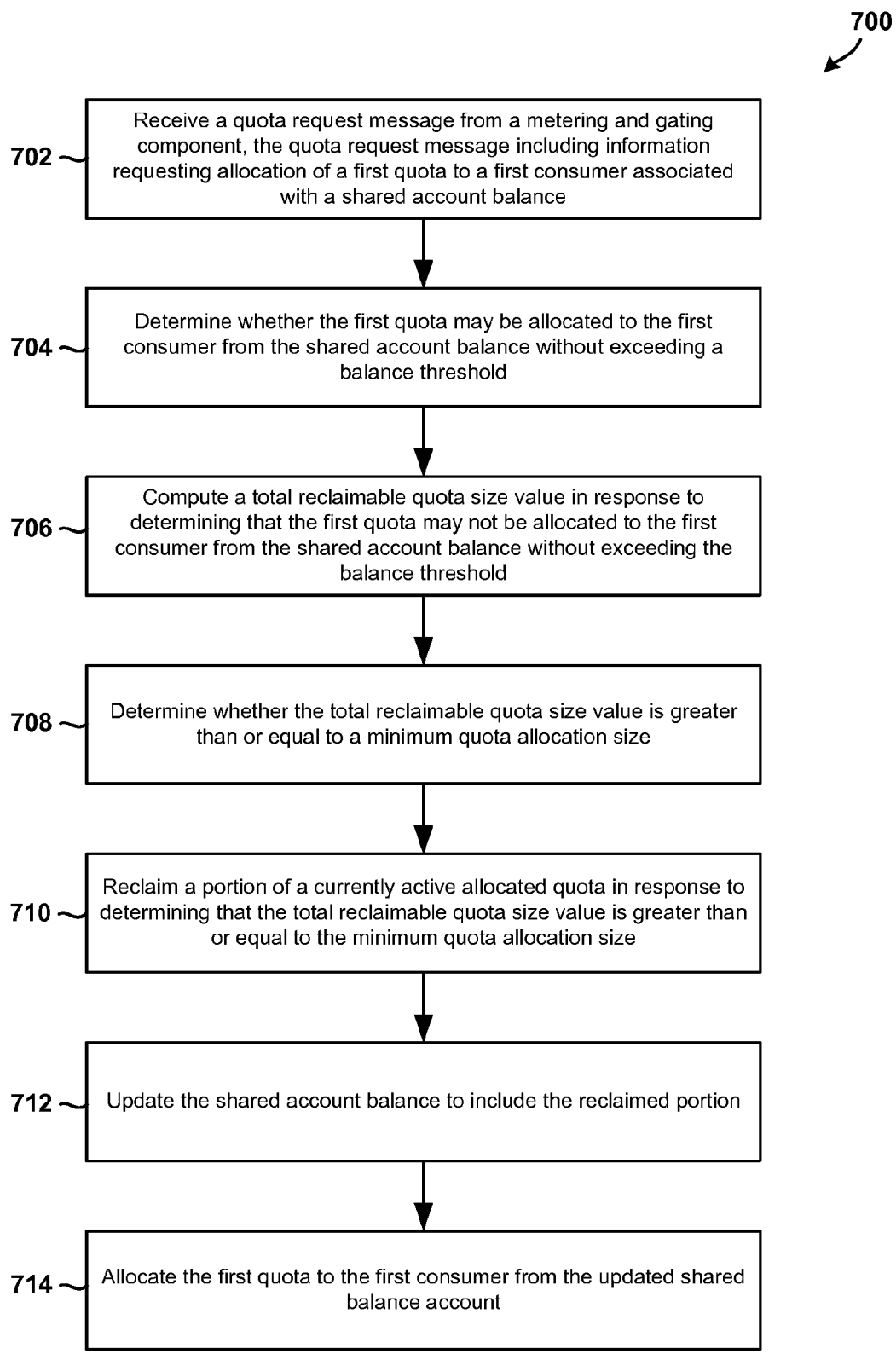
FIG. 7 is a process flow diagram illustrating a method for dynamically allocating quotas to consumers for the access and use of telecommunications network in accordance with an embodiment.

FIG. 7 illustrates method for dynamically allocating quotas in accordance with an embodiment. Method 700 may be performed by a processing core in a server computing device that includes or implements all or portions of a balance management component.

In block 702, the processing core may receive a quota request message from a metering and gating component. The quota request message may include information requesting allocation of a first quota to a first consumer associated with a shared account balance. In block 704, the processing core may determine whether the first quota may be allocated to the first consumer from the shared account balance without exceeding a balance threshold. In block 706, the processing core may compute a total reclaimable quota size value in response to determining that the first quota may not be allocated to the first consumer from the shared account balance without exceeding the balance threshold. In block 708, the processing core may determine whether the total reclaimable quota size value is greater than or equal to a minimum quota allocation size. In block 710, the processing core may reclaim a portion of a currently active allocated quota in response to determining that the total reclaimable quota size value is greater than or equal to the minimum quota allocation size. In block 712, the processing core may update the shared account balance to include the reclaimed portion. In block 714, the processing core may allocate the first quota to the first consumer from the updated shared balance account.

Figure 8:
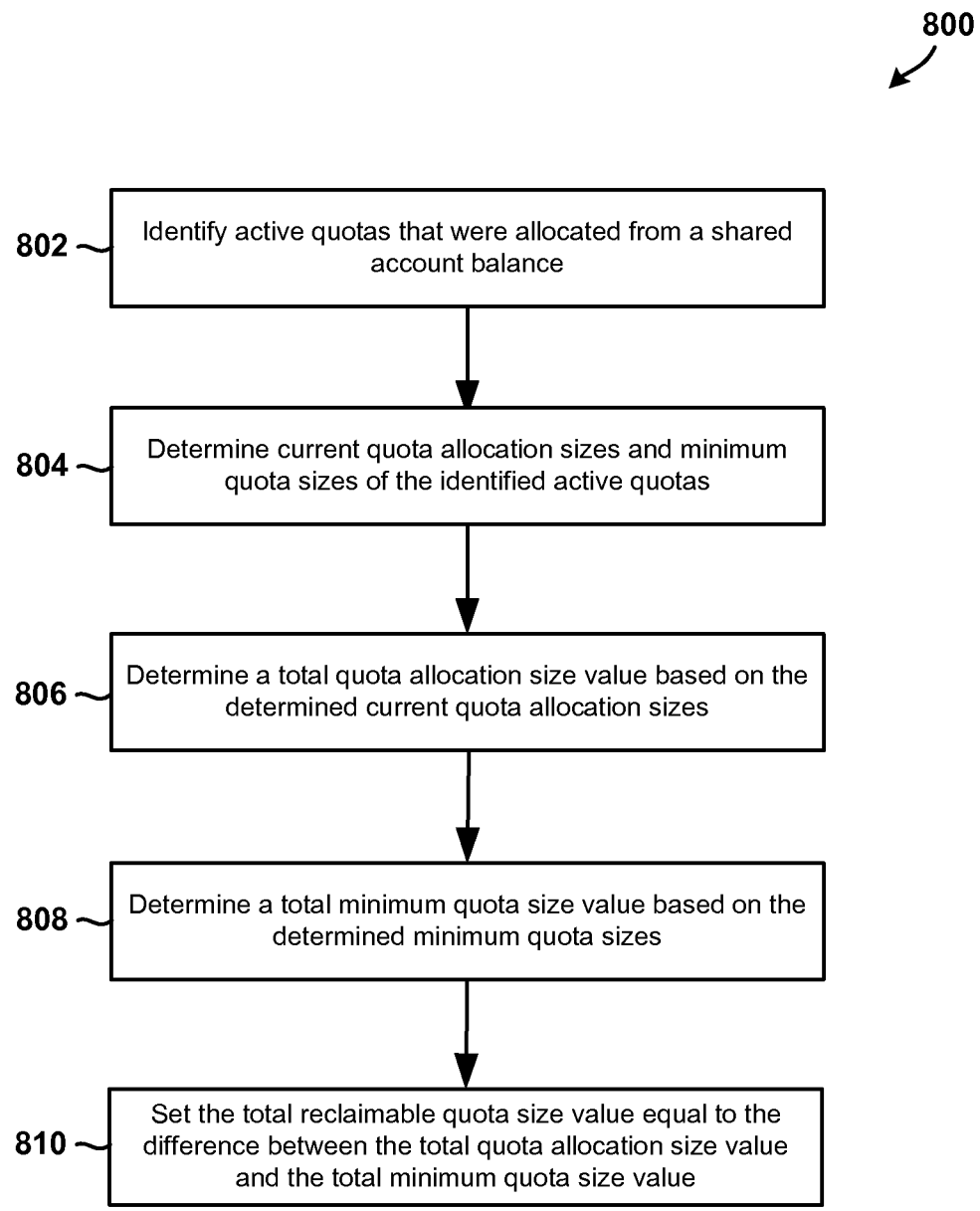
FIG. 8 is a process flow diagram illustrating a method for computing a total reclaimable quota size value that may be used to determine whether to reclaim quota in accordance an embodiment.

FIG. 8 illustrates method for determining the total reclaimable quota size value in accordance with an embodiment. Method 800 may be performed by a processing core in a server computing device that includes or implements all or portions of a balance management component.

In block 802, the processing core may identify active quotas that were allocated from a shared account balance. In block 804, the processing core may determine current quota allocation sizes and minimum quota sizes of the identified active quotas. In block 806, the processing core may determine a total quota allocation size value based on the determined current quota allocation sizes. In block 808, the processing core may determine a total minimum quota size value based on the determined minimum quota sizes. In block 810, the processing core may determine a total reclaimable quota size value based on a difference between the total quota allocation size value and total minimum quota size value. For example, the processing core may set the value of the total reclaimable quota size value to be equal to the difference between the total quota allocation size value and the total minimum quota size value.

Figure 9:
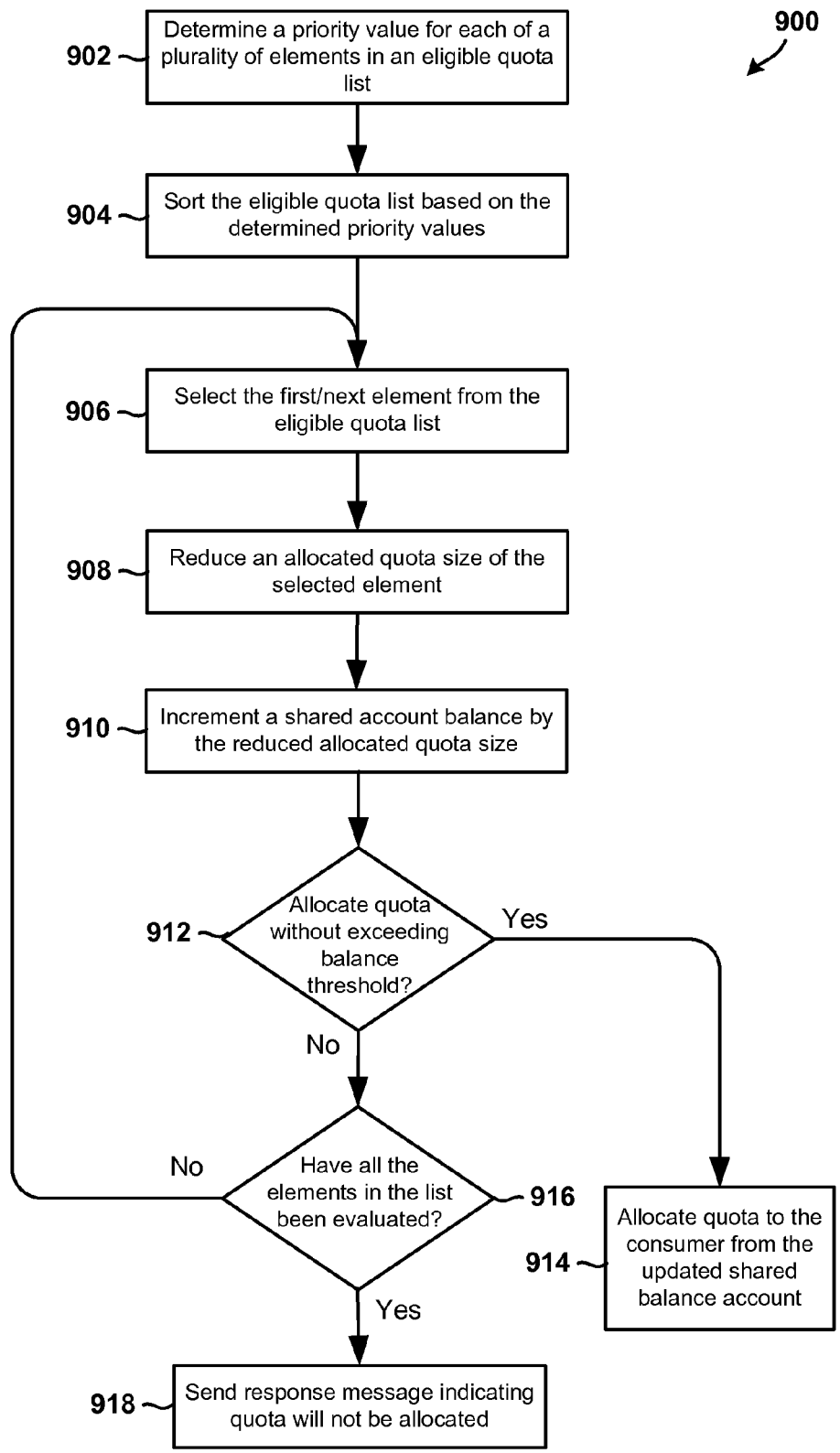
FIG. 9 is a process flow diagram illustrating a method of reclaiming allocated quotas in accordance with an embodiment.

FIG. 9 illustrates method for reclaiming portions of currently active allocated quota in accordance with an embodiment. Method 900 may be performed by a processing core in a server computing device that includes or implements all or portions of a balance management component.

In block 902, the processing core may determine a priority value for each of a plurality of elements in an eligible quota list. In block 904, the processing core may sort the eligible quota list based on the determined priority values. In block 906, the processing core may select the first or next element from the eligible quota list. In block 908, the processing core may reduce an allocated quota size of the selected element. In block 910, the processing core may increment a shared account balance by the reduced allocated quota size.

In determination block 912, the processing core may determine whether quota (e.g., access units, service unit allowances, etc.) may be allocated from the shared balance without exceeding a balance threshold, such as by determining whether the balance is greater than or equal to a quota allocation size value and/or a minimum quota allocation size value. In response to determining that quota may be allocated from the shared balance without exceeding a balance threshold (i.e., determination block 912="Yes"), in block 914, the processing core may allocate quota to the consumer from the updated shared balance account.

In response to determining that quota may not be allocated from the shared balance without exceeding a balance threshold (i.e., determination block 912="No"), in determination block 916, the processing core may determine whether all the elements in the eligible quota list been evaluated and/or reduced. In response to determining that all the elements in the eligible quota list been evaluated and/or reduced (i.e., determination block 916="No"), in block 918, the processing core may send a response message to the metering and gating component indicating that quota will not be allocated. In response to determining that all the elements in the eligible quota list been not yet evaluated and/or reduced (i.e., determination block 916="Yes"), the processing core may select the next element from the eligible quota list in block 906.

Figure 10:
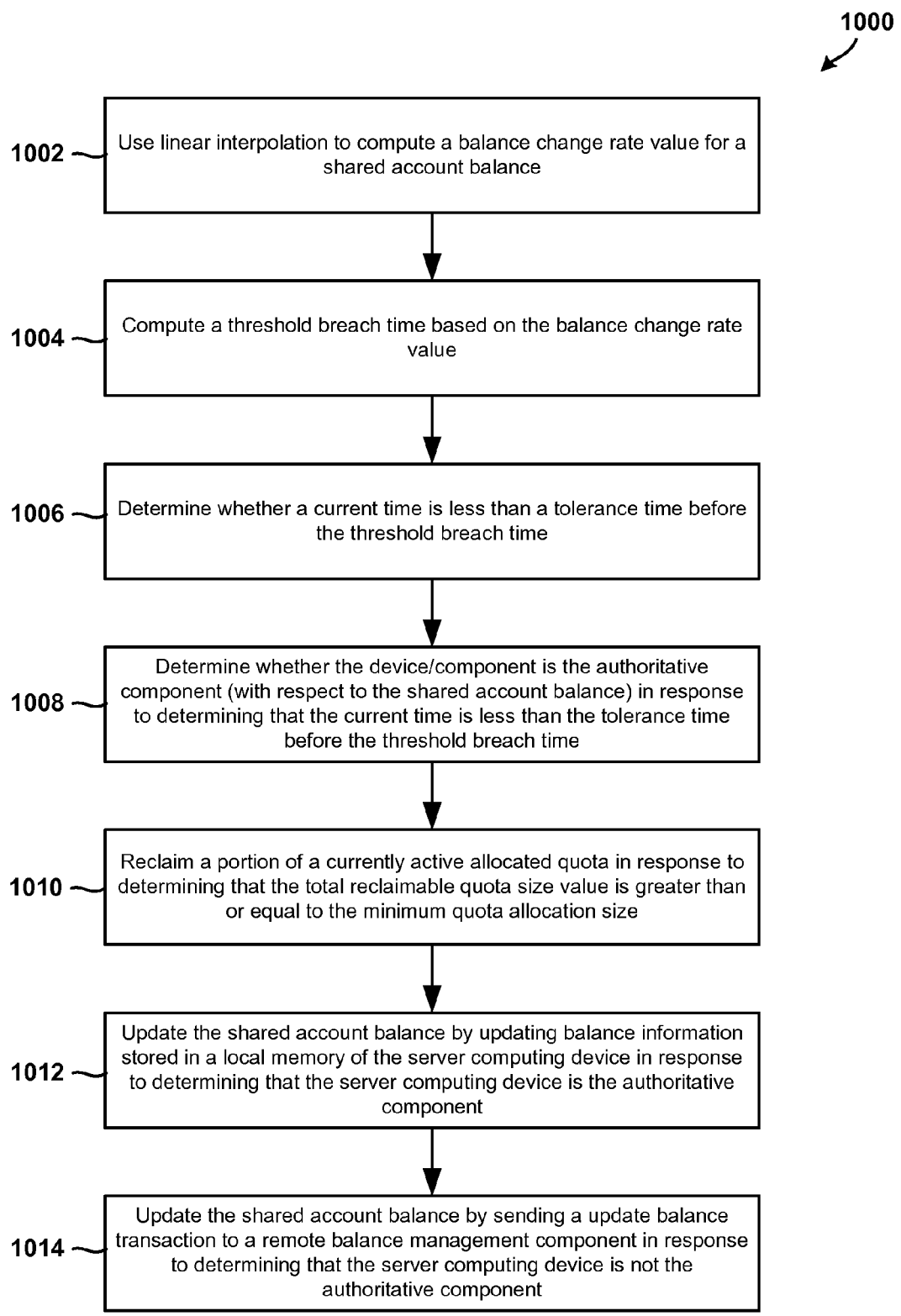
FIG. 10 is a process flow diagram illustrating a method of updating a distributed shared account balance in accordance with an embodiment.

FIG. 10 illustrates method 1000 for allocating quota to a consumer from a shared balance account in accordance with an embodiment. Method 1000 may be performed by a processing core in a server computing device that includes or implements all or portions of a balance management component.

In block 1002, the processing core may use a linear interpolation technique to compute a balance change rate value for a shared account balance. In block 1004, the processing core may compute a threshold breach time based on the balance change rate value. In block 1006, the processing core may determine whether a current time is less than a tolerance time before the threshold breach time. In block 1008, the processing core may determine whether the server computing device or balance management component is the authoritative component that has exclusive access to the shared account balance (or the most active component that is using the shared account balance) in response to determining that the current time is less than the tolerance time before the threshold breach time. In block 1010, the processing core may reclaim a portion of a currently active allocated quota in response to determining that the total reclaimable quota size value is greater than or equal to the minimum quota allocation size. In block 1012, the processing core may update the shared account balance by updating balance information stored in a local memory of the server computing device in response to determining that the server computing device is the authoritative component. In block 1014, the processing core may update the shared account balance by sending an update balance transaction to a remote balance management component in response to determining that the server computing device is not the authoritative component.

In an embodiment, the balance management component may be configured to receive a quota request message that requests the allocation of a first quota to a first consumer that is associated with a shared account balance, determine whether the first quota may be allocated to the first consumer from the shared account balance without exceeding a balance threshold, and compute a total reclaimable quota size value and determine whether the total reclaimable quota size value is greater than or equal to a minimum quota allocation size in response to determining that the first quota may not be allocated to the first consumer from the shared account balance without exceeding a balance threshold. The balance management component may reclaim a portion of a currently active allocated quota, update the shared account balance to include the reclaimed portion, and allocate the first quota to the first consumer from the updated shared balance account in response to determining that the total reclaimable quota size value is greater than or equal to a minimum quota allocation size.

In an embodiment, the balance management component may be configured to receive the quota request message, determine whether the first quota may be allocated to the first consumer from the shared account balance without exceeding a balance threshold, determine whether a second quota allocated to a second consumer from the shared account balance is eligible for reduction in response to determining that the first quota may not be allocated to the first consumer from the shared account balance without exceeding the balance threshold, and calculate a reduced quota allocation for the shared account balance in response to determining that the second quota allocated to a second consumer from the shared account balance is eligible for reduction. The balance management component may reclaim a portion of the second quota and update the shared account balance to include the reclaimed portion of the second quota in response to determining that the second quota is eligible for reduction. The balance management component may then allocate quota to the first consumer from the updated shared account balance and allocate a reduced quota to the second consumer from the updated shared balance account.

Various embodiments may include components configured to determine, identify, and/or classify the balance management component with the greatest amount of quota request or balance update transaction activity against the shared balance, or the balance management component that is most active in terms of frequency and/or magnitude of updates to the shared account balance, as being a principal, lead, primary, governing, authoritative, or controlling component (collectively "authoritative component") that is to be given exclusive access to the shared balance.

Figure 11:
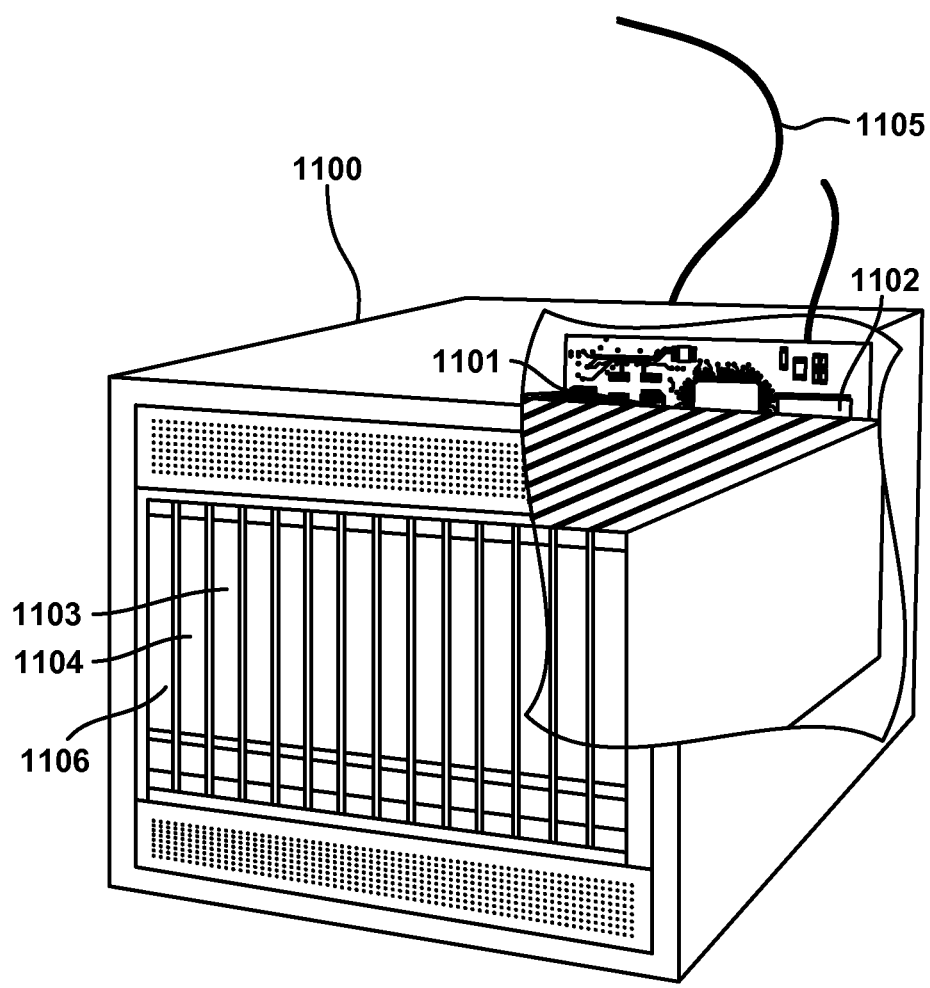
FIG. 11 is a component block diagram of server suitable for use with the various embodiments.

The various embodiments may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1105, such as a local area network coupled to other operator network computers and servers.

The processor 1101 may be any programmable microprocessor, microcomputer or multiple processor chip or chips that can be configured by software instructions (applications) to perform a variety of functions, including the functions of the various embodiments described below. Multiple processors 1101 may be provided, such as one processor dedicated to wireless communication functions and one processor dedicated to running other applications. Typically, software applications may be stored in the internal memory 1102, 1103 before they are accessed and loaded into the processor 1101. The processor 1101 may include internal memory sufficient to store the application software instructions.

As used in this application, the terms "component," "module," "system," "engine," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of dynamically allocating service units by a server computing device deployed in a telecommunications network comprising:
    receiving, in a processor of the server computing device, a quota request message from a metering and gating component, the quota request message including information requesting allocation of a first quota to a first consumer associated with a shared account balance;
    computing, via the processor, a total reclaimable quota (TRQ) size value based on an active quota allocations list in response to the processor determining that the requested first quota may not be allocated to the first consumer from the shared account balance without exceeding a balance threshold;
    determining, via the processor, a minimum quota allocation (MQA) size value, wherein the MQA size comprises a lowest quota allocation size that does not cause excessive signaling traffic in the network;
 determining, via the processor, whether the computed TRQ size value is greater than or equal to the determined MQA size value;
    reclaiming, via the processor, a portion of a currently active allocated quota and updating the shared account balance to include the reclaimed portion in response to the processor determining that the computed TRQ size value is greater than or equal to the determined MQA size value; and
    allocating, via the processor, the requested first quota to the first consumer from the updated shared balance account, wherein the allocating includes:
    using linear interpolation to compute a balance change rate value for the shared account balance;
    computing a threshold breach time based on the computed balance change rate value;
    determining whether a current time is less than a tolerance time before the computed threshold breach time;
    determining whether the server computing device is an authoritative component that has exclusive access to the shared account balance in response to determining that the current time is less than the tolerance time before the computed threshold breach time;
    updating the shared account balance by updating balance information stored in a local memory in response to determining that the server computing device is the authoritative component; and
    updating the shared account balance by sending an update balance transaction to a remote balance management component in response to determining that the server computing device is not the authoritative component.

2. The method of claim 1, wherein computing the TRQ size value based on the active quota allocations list further comprises:
  identifying active quotas that were allocated from the shared account balance;
  determining current quota allocation sizes and minimum quota sizes of the identified active quotas;
  computing a total quota allocation (TQA) size value based on the determined current quota allocation sizes;
  computing a total minimum quota (TMQ) size value based on the determined minimum quota sizes; and
  computing the TRQ size value based on a difference between the computed TQA size value and the computed TMQ size value.

3. The method of claim 1, wherein reclaiming the portion of the currently active allocated quota and updating the shared account balance to include the reclaimed portion in response to determining that the computed TRQ size value is greater than or equal to the determined MQA size value further comprises:
  determining a priority value for each of a plurality of elements in an eligible quota list, wherein one of the plurality of elements is the currently active allocated quota;
  sorting the eligible quota list based on the determined priority values; and
  traversing the sorted eligible quota list sequentially to:
  select an element from the eligible quota list;
  reduce an allocated quota size of the selected element; and
  increment the shared account balance by the reduced allocated quota size.

4. The method of claim 3, wherein:
  traversing the sorted eligible quota list sequentially further comprises:
    determining whether the requested first quota may be allocated to the first consumer from the shared account balance without exceeding the balance threshold every time the shared account balance is incremented.

5. The method of claim 3, wherein reducing the allocated quota size of the selected element comprises sending a communication message to a metering and gating component associated with selected element to cause that metering and gating component to return unused allocated quota that is in excess of the determined MQA size value.

6. The method of claim 3, wherein reducing the allocated quota size of the selected element comprises:
  sending a first communication message to the metering and gating component associated with selected element to cause that metering and gating component to return all its unused allocated quota;
  sending a second communication message to the metering and gating component associated with selected element to reallocate quota.

7. The method of claim 3, wherein reducing the allocated quota size of the selected element comprises reducing the allocated quota size by half of its unused allocated quota that is in excess of the determined MQA size value.

8. The method of claim 3, wherein sorting the eligible quota list based on the determined priority values comprises sorting the eligible quota list based on:
  allocated quota sizes of the elements;
  minimum quota sizes of the elements;
  difference between the allocated quota sizes and the minimum quota sizes of the elements;
  quota expiry times of the elements;
  subscriber types of the elements;
  session types of the elements; or
  service types of the elements.

9. The method of claim 1, further comprising:
  determining whether the requested first quota may be allocated to the first consumer from the shared account balance without exceeding the balance threshold by determining whether the shared account balance is greater than or equal to a quota allocation size value included in the received quota request message.

10. The method of claim 1, further comprising sending a communication message to the metering and gating component indicating that quota will not be allocated in response to determining that the computed TRQ size value is not greater than or equal to the determined MQA size value.

11. A server computing device deployed in a telecommunication telecommunications network, comprising:
  a processor configured with processor-executable instructions to perform operations comprising:
    receiving a quota request message from a metering and gating component, the quota request message including information requesting allocation of a first quota to a first consumer associated with a shared account balance;
    computing a total reclaimable quota (TRQ) size value based on an active quota allocations list in response to determining that the requested first quota may not be allocated to the first consumer from the shared account balance without exceeding a balance threshold;
    determining a minimum quota allocation (MQA) size value, wherein the MQA size comprises a lowest quota allocation size that does not cause excessive signaling traffic in the network;
    determining whether the computed TRQ size value is greater than or equal to the determined MQA size value;
    reclaiming a portion of a currently active allocated quota and updating the shared account balance to include the reclaimed portion in response to determining that the computed TRQ size value is greater than or equal to the determined MQA size value; and
    allocating the requested first quota to the first consumer from the updated shared balance account, wherein the allocating includes:
    using linear interpolation to compute a balance change rate value for the shared account balance;
    computing a threshold breach time based on the computed balance change rate value;
    determining whether a current time is less than a tolerance time before the computed threshold breach time;
    determining whether the server computing device is an authoritative component that has exclusive access to the shared account balance in response to determining that the current time is less than the tolerance time before the computed threshold breach time;
    updating the shared account balance by updating balance information stored in a local memory in response to determining that the server computing device is the authoritative component; and
    updating the shared account balance by sending an update balance transaction to a remote balance management component in response to determining that the server computing device is not the authoritative component.

12. The server computing device of claim 11, wherein the processor is configured with processor-executable instructions to perform operations such that computing the TRQ size value based on the active quota allocations list further comprises:
  identifying active quotas that were allocated from the shared account balance;

determining current quota allocation sizes and minimum quota sizes of the identified active quotas;

computing a total quota allocation (TQA) size value based on the determined current quota allocation sizes;

computing a total minimum quota (TMQ) size value based on the determined minimum quota sizes; and computing the TRQ size value based on a difference between the computed TQA size value and the computed TMQ size value.

13. The server computing device of claim 11, wherein the processor is configured with processor-executable instructions to perform operations such that reclaiming the portion of the currently active allocated quota and updating the shared account balance to include the reclaimed portion in response to determining that the computed TRQ size value is greater than or equal to the determined MQA size value further comprises:

determining a priority value for each of a plurality of elements in an eligible quota list, wherein one of the plurality of elements is the currently active allocated quota; sorting the eligible quota list based on the determined priority values; and traversing the sorted eligible quota list sequentially to:
select an element from the eligible quota list;
reduce an allocated quota size of the selected element; and
increment the shared account balance by the reduced allocated quota size.

14. The server computing device of claim 13, wherein the processor is configured with processor-executable instructions to perform operations such that:

traversing the sorted eligible quota list sequentially further comprises:

determining whether the requested first quota may be allocated to the first consumer from the shared account balance without exceeding the balance threshold every time the shared account balance is incremented.

15. The server computing device of claim 13, wherein the processor is configured with processor-executable instructions to perform operations such that reducing the allocated quota size of the
selected element comprises sending a communication message to a metering and gating component associated with selected element to cause that metering and gating component to return unused allocated quota that is in excess of the determined MQA size value.

16. The server computing device of claim 13, wherein the processor is configured with processor-executable instructions to perform operations such that sorting the eligible quota list based on the determined priority values comprises sorting the eligible quota list based on:
allocated quota sizes of the elements;
minimum quota sizes of the elements;
difference between the allocated quota sizes and the minimum quota sizes of the elements;
quota expiry times of the elements;
subscriber types of the elements;
session types of the elements; or
service types of the elements.

17. The server computing device of claim 11, wherein the processor is configured with processor-executable instructions to perform operations further comprising:
determining whether the requested first quota may be allocated to the first consumer from the shared account balance without exceeding the balance threshold by determining whether the shared account balance is greater than or equal to a quota allocation size value included in the received quota request message.

18. A non-transitory computer readable storage medium having stored thereon processor-executable software instructions configured to cause a processor of a server computing device to perform operations comprising:

receiving a quota request message from a metering and gating component, the quota request message including information requesting allocation of a first quota to a first consumer associated with a shared account balance;

computing a total reclaimable quota (TRQ) size value based on an active quota allocations list in response to determining that the requested first quota may not be allocated to the first consumer from the shared account balance without exceeding a balance threshold;

determining a minimum quota allocation (MQA) size value, wherein the MQA size comprises a lowest quota allocation size that does not cause excessive signaling traffic in the network;

determining whether the computed TRQ size value is greater than or equal to the determined MQA size value;

reclaiming a portion of a currently active allocated quota and updating the shared account balance to include the reclaimed portion in response to determining that the computed TRQ size value is greater than or equal to the determined MQA size value; and allocating the requested first quota to the first consumer from the updated shared balance account, wherein the allocating includes:

using linear interpolation to compute a balance change rate value for the shared account balance;

computing a threshold breach time based on the computed balance change rate value;

determining whether a current time is less than a tolerance time before the computed threshold breach time;

determining whether the server computing device is an authoritative component that has exclusive access to the shared account balance in response to determining that the current time is less than the tolerance time before the computed threshold breach time;

updating the shared account balance by updating balance information stored in a local memory in response to determining that the server computing device is the authoritative component; and updating the shared account balance by sending an update balance transaction to a remote balance management component in response to determining that the server computing device is not the authoritative component.

19. The non-transitory computer readable storage medium of claim 18, wherein the stored processor-executable software instructions are configured to cause a processor to perform operations such that computing the TRQ size value based on the active quota allocations list further comprises:

identifying active quotas that were allocated from the shared account balance;

determining current quota allocation sizes and minimum quota sizes of the identified active quotas;

computing a total quota allocation (TQA) size value based on the determined current quota allocation sizes;

computing a total minimum quota (TMQ) size value based on the determined minimum quota sizes; and computing the TRQ size value based on a difference between the computed TQA size value and the computed TMQ size value.

20. The non-transitory computer readable storage medium of claim 18, wherein the stored processor-executable software instructions are configured to cause a processor to perform operations such that reclaiming the portion of the currently active allocated quota and updating the shared account balance to include the reclaimed portion in response to determining that the computed TRQ size value is greater than or equal to the determined MQA size value further comprises:

determining a priority value for each of a plurality of elements in an eligible quota list, wherein one of the plurality of elements is the currently active allocated quota;

sorting the eligible quota list based on the determined priority values; and traversing the sorted eligible quota list sequentially to:

select an element from the eligible quota list;

reduce an allocated quota size of the selected element; and increment the shared account balance by the reduced allocated quota size.

21. The non-transitory computer readable storage medium of claim 20, wherein the stored processor-executable software instructions are configured to cause a processor to perform operations such that:

traversing the sorted eligible quota list sequentially further comprises:

determining whether the requested first quota may be allocated to the first consumer from the shared account balance without exceeding the balance threshold every time the shared account balance is incremented.

22. The non-transitory computer readable storage medium of claim 20, wherein the stored processor-executable software instructions are configured to cause a processor to perform operations such that reducing the allocated quota size of the selected element comprises sending a communication message to a metering and gating component associated with selected element to cause that metering and gating component to return unused allocated quota that is in excess of the determined MQA size value.

23. The non-transitory computer readable storage medium of claim 20, wherein the stored processor-executable software instructions are configured to cause a processor to perform operations such that sorting the eligible quota list based on the determined priority values comprises sorting the eligible quota list based on:

allocated quota sizes of the elements;

minimum quota sizes of the elements;

difference between the allocated quota sizes and the minimum quota sizes of the elements;

quota expiry times of the elements;

subscriber types of the elements;

session types of the elements; or service types of the elements.

\* \* \* \* \*

UNITED STATES PATENT AND TRADEMARK OFFICE
CERTIFICATE OF CORRECTION

PATENT NO. : 10,063,712 B2
APPLICATION NO. : 14/311301
DATED : August 28, 2018
INVENTOR(S) : Tony Gillick et al.

Page 1 of 1

It is certified that error appears in the above-identified patent and that said Letters Patent is hereby corrected as shown below:

In the Claims

Please replace the preamble in Claim 11, found in Column 36, Lines 13 and 14, as shown below:
"11. A server computing device deployed in a telecommunication telecommunications network, comprising:"
With the following:
--11. A server computing device deployed in a telecommunications network, comprising:--

Signed and Sealed this
Sixth Day of November, 2018

Andrei Iancu
*Director of the United States Patent and Trademark Office*